Figure 1:
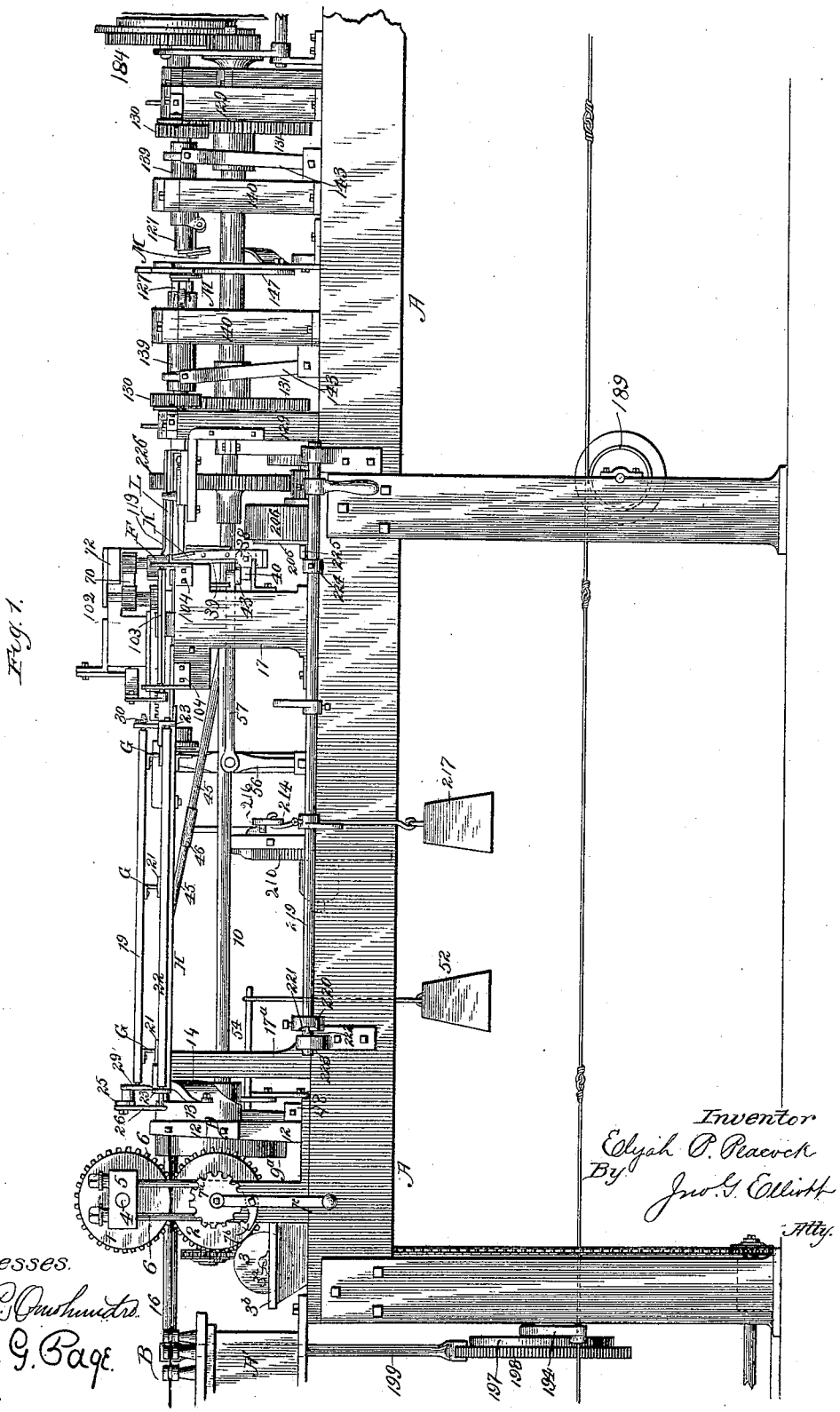

(No Model.) 13 Sheets—Sheet 1.
E. P. PEACOCK.
MACHINE FOR MAKING CHECK ROW WIRE.
No. 337,430. Patented Mar. 9, 1886.

Witnesses.
Will R. Crushundre.
Chas. G. Page.

Inventor
Elijah P. Peacock
By Jno. G. Elliott
Atty.

(No Model.) 13 Sheets—Sheet 2.
E. P. PEACOCK.
MACHINE FOR MAKING CHECK ROW WIRE.
No. 337,430. Patented Mar. 9, 1886.

Witnesses,
Will R. Onehundred
Chas. G. Page

Inventor
Elijah P. Peacock
By Jno. G. Elliott
Atty.

(No Model.) 13 Sheets—Sheet 3.
E. P. PEACOCK.
MACHINE FOR MAKING CHECK ROW WIRE.
No. 337,430. Patented Mar. 9, 1886.
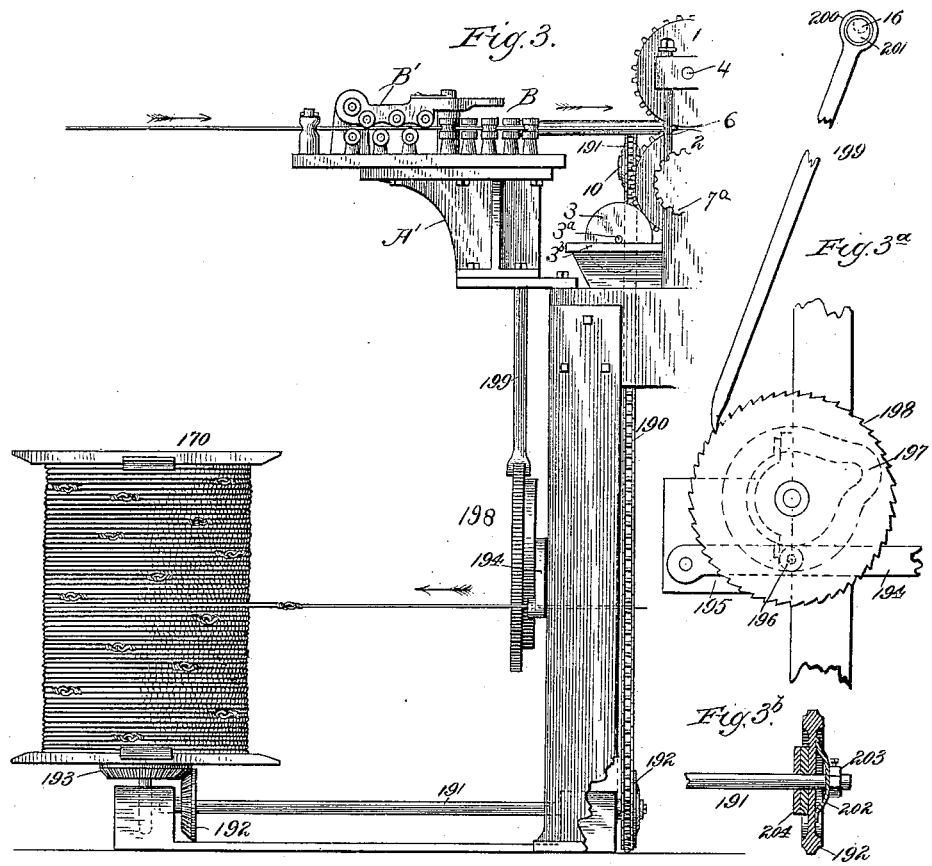
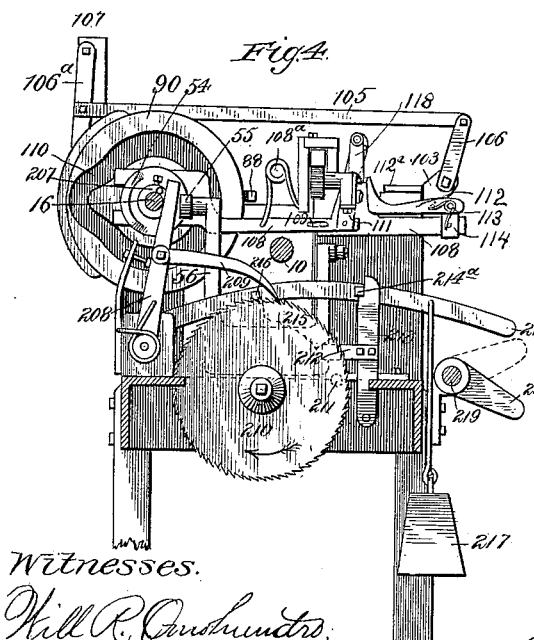
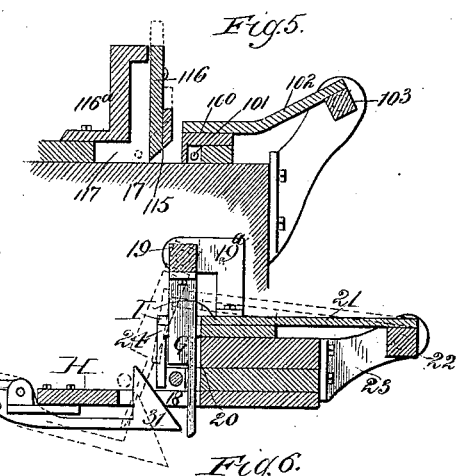
Witnesses.
Will R. Crushunders.
Chas. G. Page.
Inventor
Elijah P. Peacock
By Jno. G. Elliott
Atty.

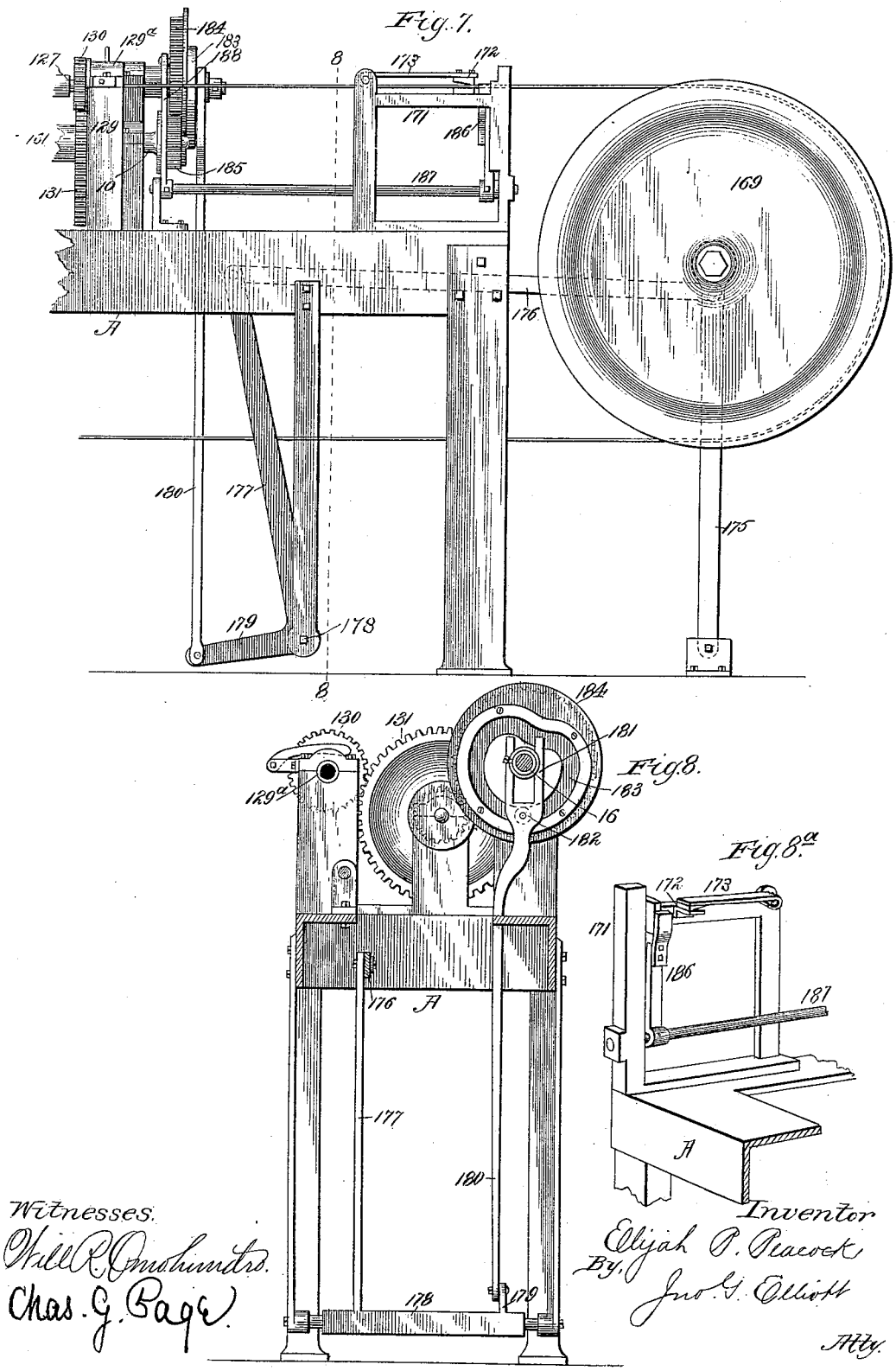

(No Model.) 13 Sheets—Sheet 5.
E. P. PEACOCK.
MACHINE FOR MAKING CHECK ROW WIRE.
No. 337,430. Patented Mar. 9, 1886.
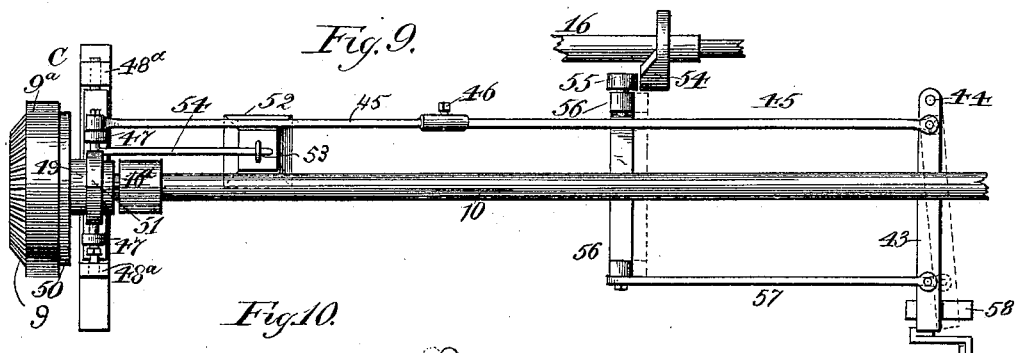
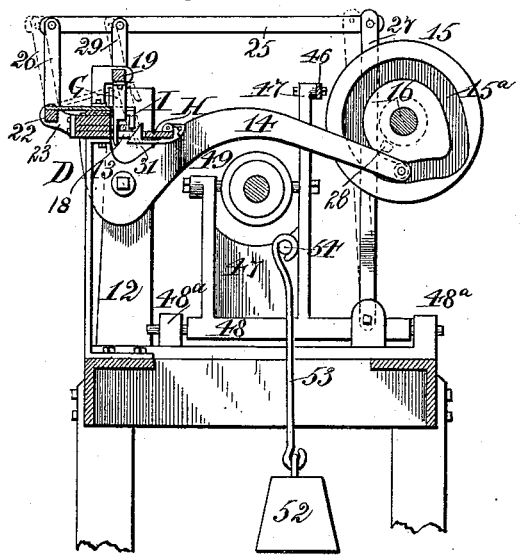
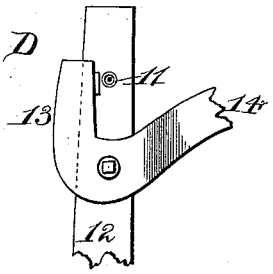
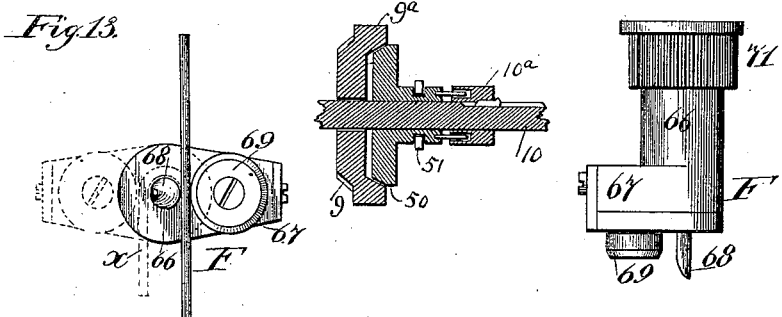
Witnesses.
Will R. Onohundro
Chas. G. Page.
Inventor.
Elijah P. Peacock
By, Jno. G. Elliott
Atty.

(No Model.) 13 Sheets—Sheet 6.

E. P. PEACOCK.
MACHINE FOR MAKING CHECK ROW WIRE.

No. 337,430. Patented Mar. 9, 1886.

Witnesses.
Will C. Ormshundro.
Chas. G. Page.

Inventor
Elijah P. Peacock,
By, Jno. G. Elliott
Atty (No Model.) 13 Sheets—Sheet 7.
E. P. PEACOCK.
MACHINE FOR MAKING CHECK ROW WIRE.
No. 337,430. Patented Mar. 9, 1886.
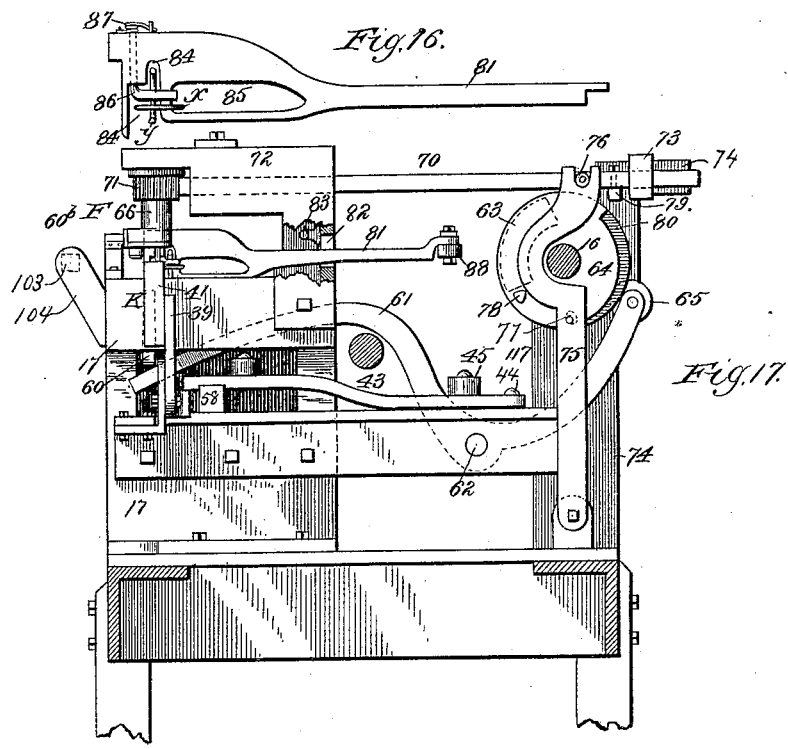
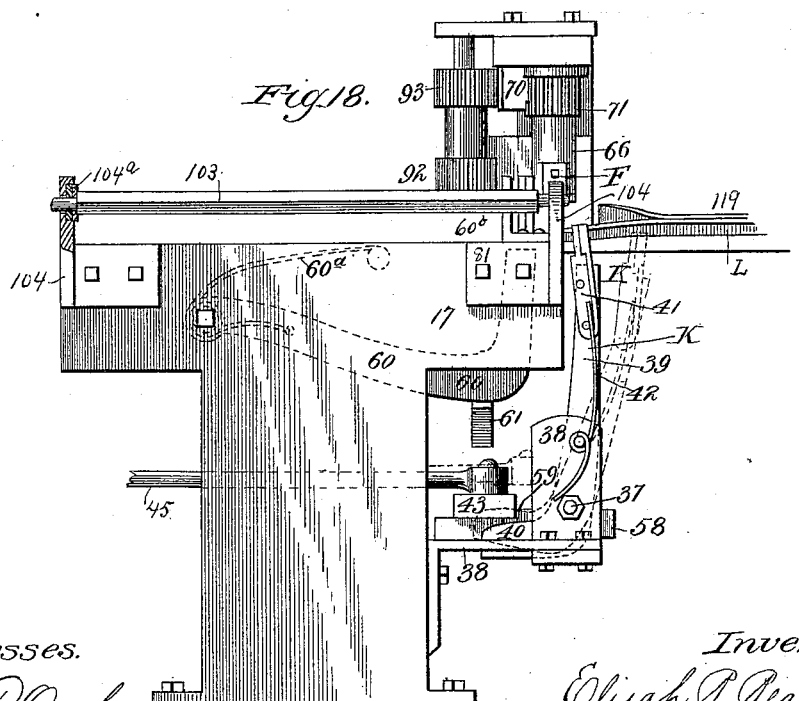
Witnesses.
Inventor
Elijah P. Peacock
By, Jno. G. Elliott
Atty.

(No Model.) 13 Sheets—Sheet 8.
E. P. PEACOCK.
MACHINE FOR MAKING CHECK ROW WIRE.
No. 337,430. Patented Mar. 9, 1886.
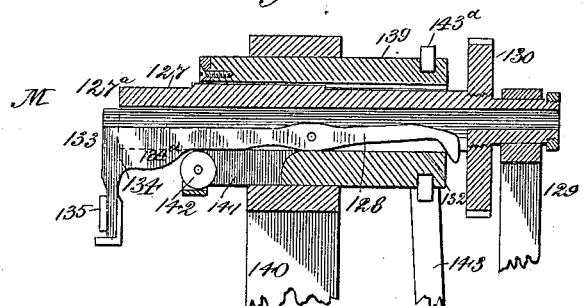
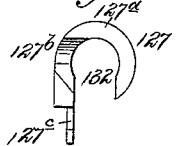
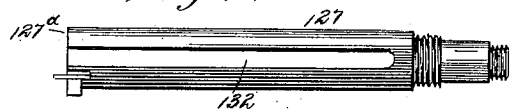
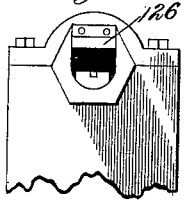
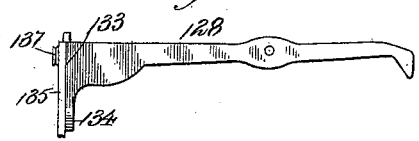
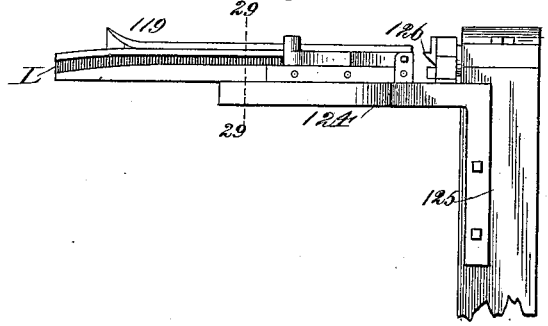
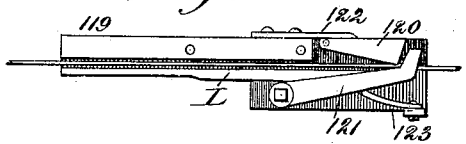
Witnesses.
Will P. Omohundro,
Chas. G. Page.
Inventor
Elijah P. Peacock
By Jno. G. Elliott
Atty.

(No Model.)  13 Sheets—Sheet 9.

E. P. PEACOCK.
MACHINE FOR MAKING CHECK ROW WIRE.

No. 337,430.  Patented Mar. 9, 1886.

Witnesses.  
Will R. Omohundro.  
Chas. G. Page.

Inventor  
Elijah P. Peacock  
By Jno. G. Elliott  
Atty.

(No Model.)  
13 Sheets—Sheet 10.
E. P. PEACOCK.
MACHINE FOR MAKING CHECK ROW WIRE.
No. 337,430. Patented Mar. 9, 1886.
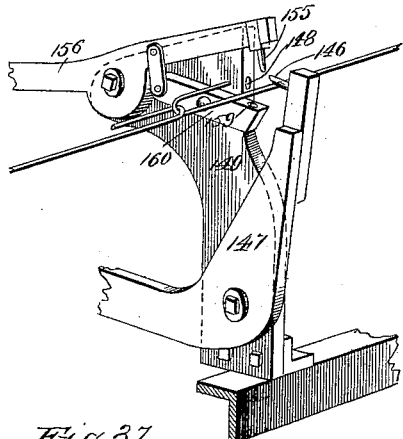
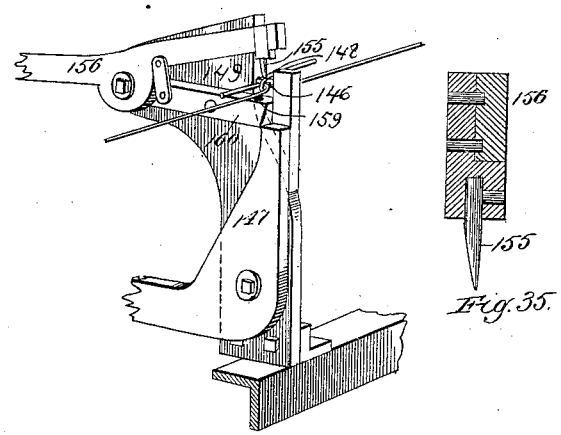
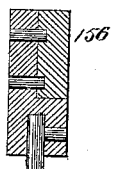
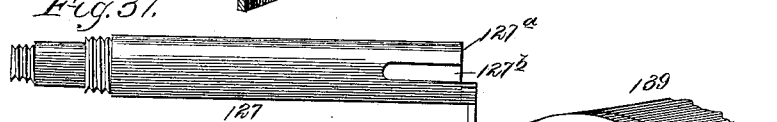
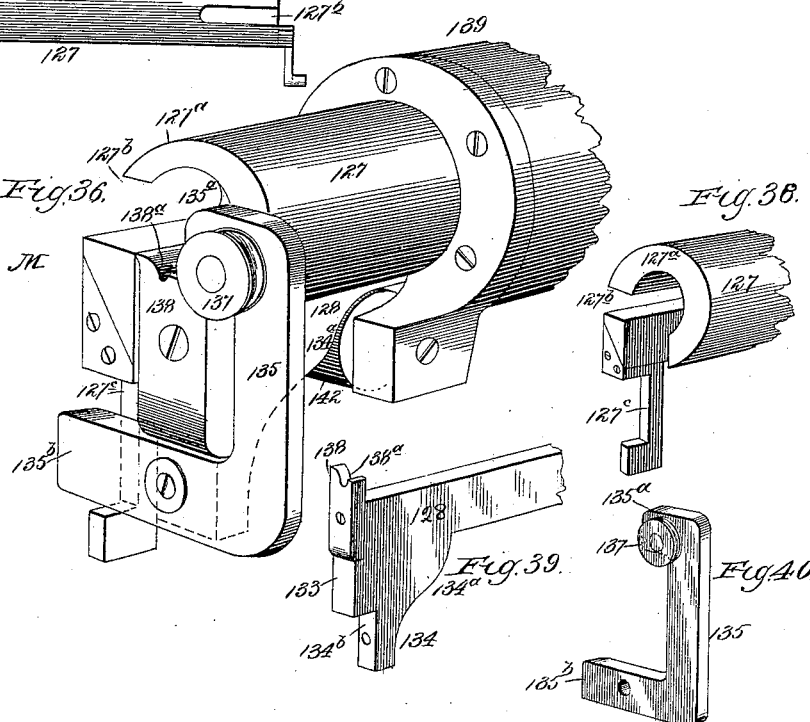
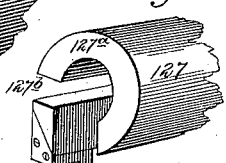
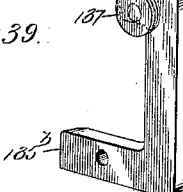
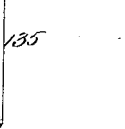
Witnesses.  
Will R. Onehundrd.  
Chas. G. Page.
Inventor,  
Elijah P. Peacock  
By, Jno. G. Elliott  
Atty.

(No Model.) 13 Sheets—Sheet 12.
E. P. PEACOCK.
MACHINE FOR MAKING CHECK ROW WIRE.
No. 337,430. Patented Mar. 9, 1886.
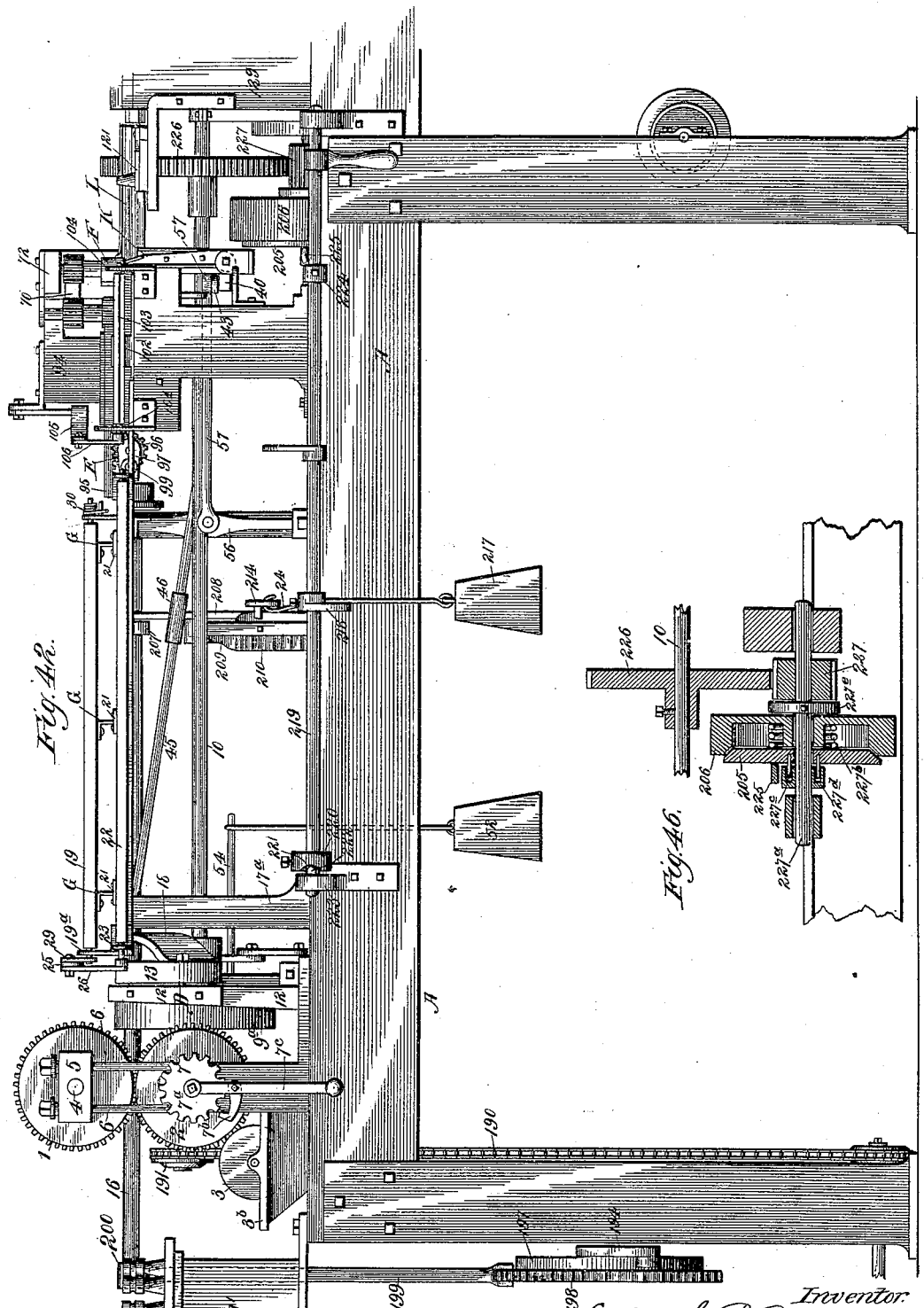
Witnesses.
Inventor:
Elijah P. Peacock
By, Jno. G. Elliott
Atty.

(No Model.) 13 Sheets—Sheet 13.

E. P. PEACOCK.
MACHINE FOR MAKING CHECK ROW WIRE.

No. 337,430. Patented Mar. 9, 1886.

Witnesses. Inventor.
Elijah P. Peacock
By Jno. G. Elliott
Atty.

UNITED STATES PATENT OFFICE.

ELIJAH P. PEACOCK, OF CHICAGO, ASSIGNOR TO THE JOLIET WIRE-CHECK-ROW COMPANY, OF JOLIET, ILLINOIS.

MACHINE FOR MAKING CHECK-ROW WIRE.

SPECIFICATION forming part of Letters Patent No. 337,430, dated March 9, 1886.

Application filed January 12, 1885. Serial No. 152,590. (No model.)

*To all whom it may concern:*

Be it known that I, ELIJAH P. PEACOCK, a citizen of the United States, residing in Chicago, county of Cook, and State of Illinois, have invented certain new and useful Improvements in Machines for Making Check-Row Wire, of which the following is a specification.

This invention relates to check-row-wire machines for forming check-row wire of that class in which the wire is automatically severed into regular lengths, and these lengths then connected together by links or eyes formed at the ends of the wires, which latter at their terminals are coiled back of their connected eyes or links, so as to form checks or shoulders at intervals along a practically continuous wire.

The general plan upon which I have designed my machine to operate is to sever the wire into lengths, bend these lengths into hook shape at their ends, connect these hooks in pairs, and coil the free ends of the hooks around the wires, so as to form in a practically continuous wire pairs of connected eyes with checks or shoulders back of the same.

The features of my invention are hereinafter described and claimed, and illustrated in the annexed drawings, in which—

Figure 2:
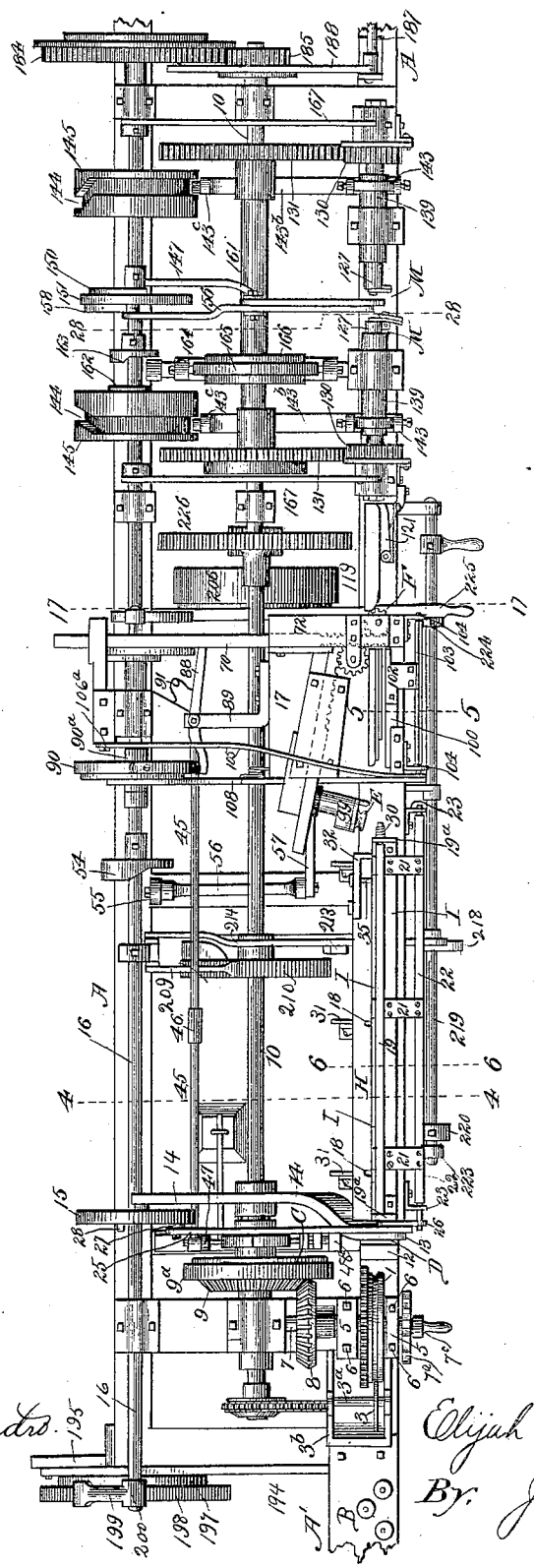
Figures 14, 15:
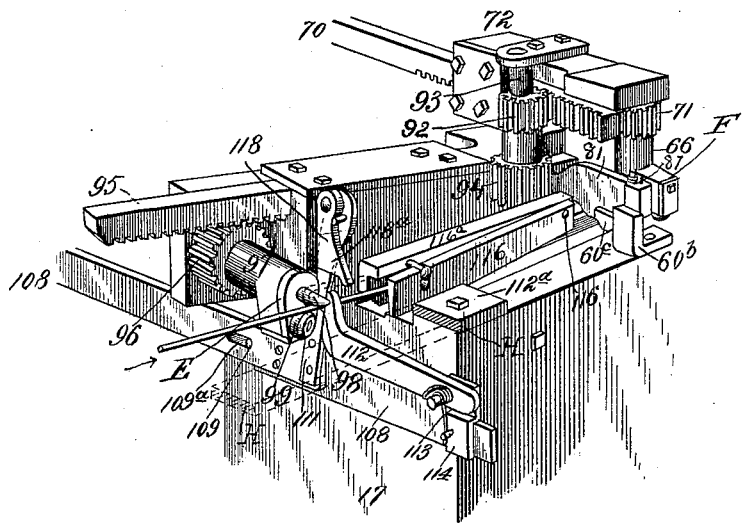
Figure 28:
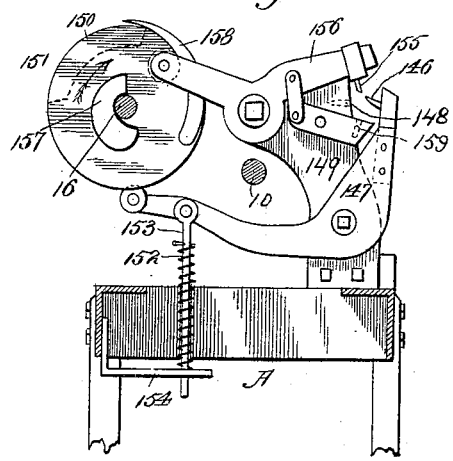
Figure 29:
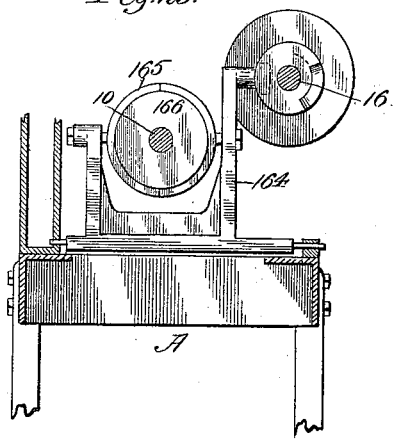
Figure 30:
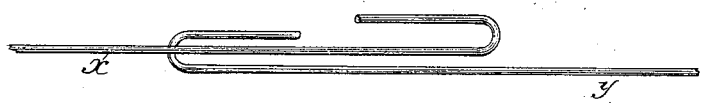
Figure 31:
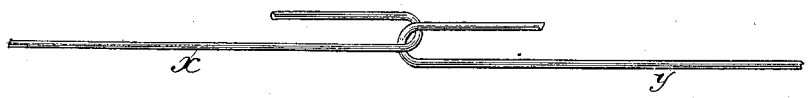
Figure 32:
Figure 41:
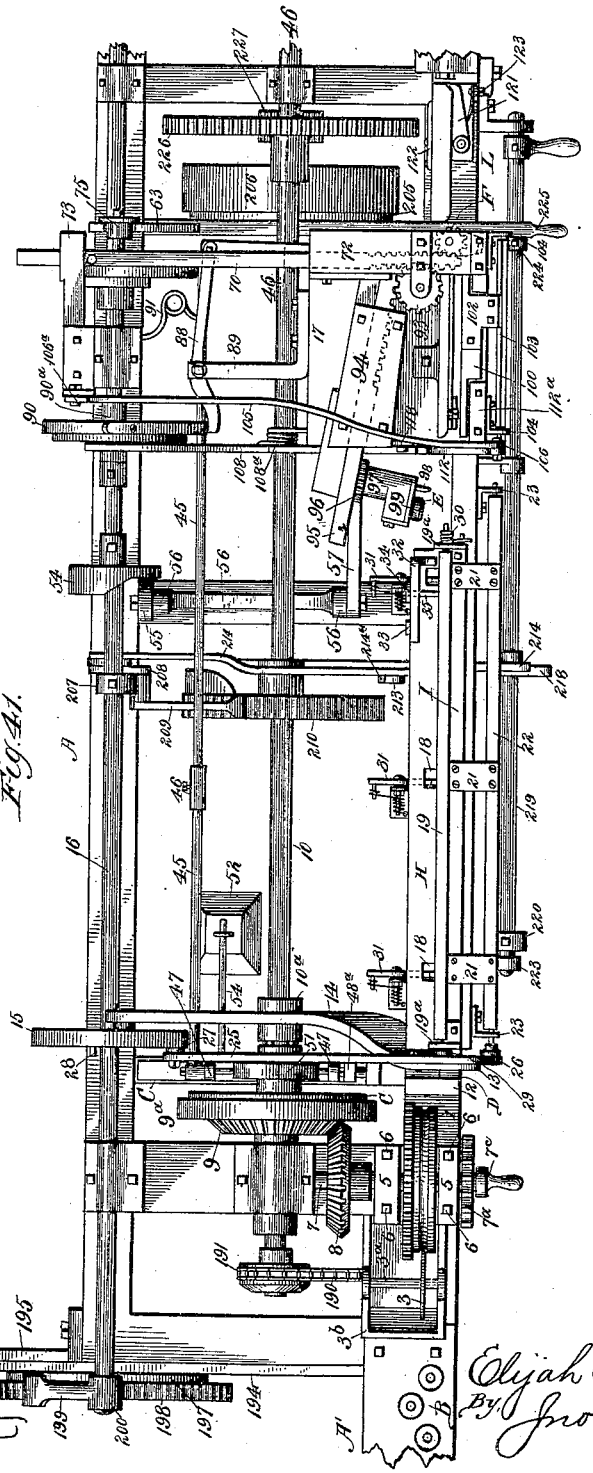
Figure 45:
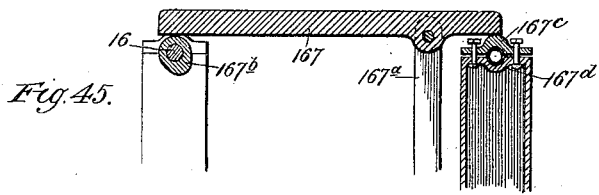
Figure 43:
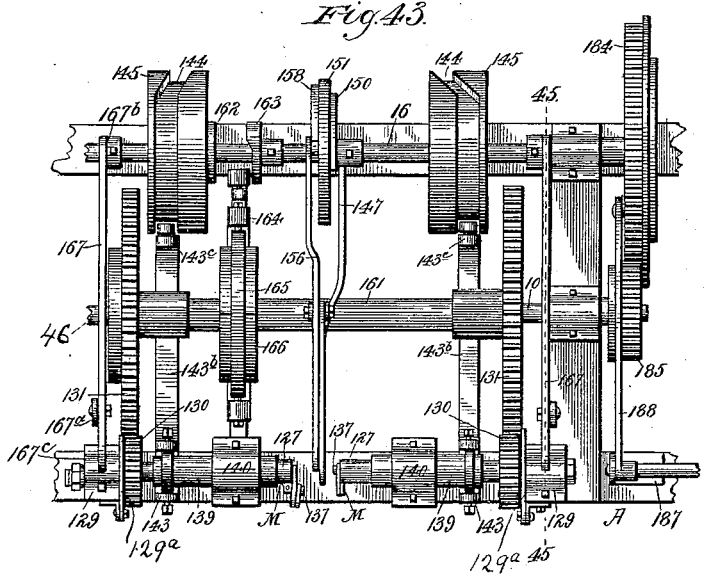
Figure 44:
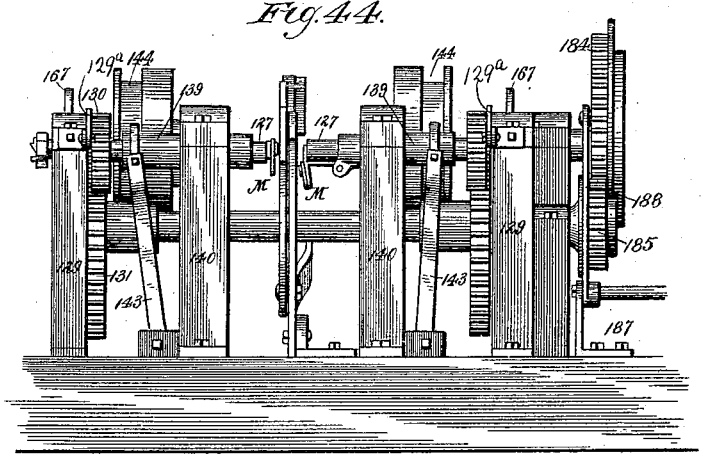

Figure 1 is a side elevation with portions of the machine broken away at each end thereof. Fig. 2 is a top plan view of the same. Fig. 3 is a side elevation of the feed end portion of the machine, which view includes the reel on which the finished wire is wound. Fig. 3$^a$ is a detail view showing mechanism for operating a reciprocatory or vibratory guide, by which the finished wire is guided so as to be wound from end to end of and in successive layers on the reel. Fig. 3$^b$ is a sectional detail showing a spring by which a loose gear or sprocket on shaft 191 is under ordinary circumstances held in rigid connection with said shaft, through the medium of which latter the reel is driven. Fig. 4 is a transverse section taken on a vertical plane indicated by line 4 4, Fig. 2, looking toward the delivery end of the machine. Fig. 5 represents on a larger scale a sectional detail taken transversely through a portion of the machine on line 5 5, Fig. 2, this view being designed to illustrate a pair of guide-passages for the wires. Fig. 6 is a sectional detail taken transversely through a portion of the machine on line 6 6, Fig. 2, and illustrates one of the kickers, a swinging keeper, and a latch, whereby a wire which has been fed forward under the keeper and then severed, can be kicked away from the line of feed and prevented from springing back into the line of feed. Fig. 7 is a side elevation of the delivery end portion of the machine, which view includes the throw-lever or delivery mechanism for drawing the wire through the machine. Fig. 8 is a transverse section taken on a vertical plane through line 8 8, Fig. 7, looking toward the feed end of the machine. Fig. 8$^a$ is a detail perspective of the wire-holding device. Fig. 9 is a detail top plan view of mechanism for actuating a clutch by which the feed is controlled and for locking the clutch-shifting mechanism. Fig. 9$^a$ represents a detail section taken through the friction-clutch which is shown in plan view in the preceding figure. Fig. 10 is a transverse section on a vertical plane indicated by line 4 4, Fig. 2, and looking toward the feed end of the machine. Fig. 11 is a detail showing the operative portion of the cutter. Fig. 12 shows one of the benders. Fig. 13 is a face view of the bender with the wire in position to be bent. This view also illustrates in dotted lines the bent wire and the position of the bender at a time when it has just completed the bending operation. Fig. 14 is a detail perspective view, and principally illustrates the mechanism by which the two benders are simultaneously operated, means for bringing a wire up to one bender, and a latch by which the wire is held down after being bent, and a guide-passage having a movable slide which is susceptible of being lifted by a wire which is being pushed laterally into the said passage. Fig. 15 is a detail perspective view illustrating a gravity-holder operated by the rock-shaft carrying the kickers, said holder being designed to hold down a point between the feed end of the machine and the first bender, E. Fig. 16 is an enlarged view of a sliding and swinging bar, 81. (Shown in Fig. 17.) Fig. 17 is a sectional elevation taken transversely through the machine on the line 17 17, Fig. 2, looking toward the feed end of the machine. Fig. 18 is a front side elevation of a portion of Fig. 1, but on a larger scale, said view principally illustrating the tripping-lever by which a latch connected with the clutch-shifting mechanism is released to stop the feed, and also illustrating, partly in full and partly in dotted lines, a wire-lifter by which a wire is lifted up to the bender F. Fig. 19 represents a longitudinal central section taken through one of the coilers. Fig. 20 represents the slotted stem of one of the coilers. Fig. 21 is an end view of the said stem. Fig. 22 is a detail showing the entrance to a guide-passage and guide designed to be located in advance of the first of the two coilers. Fig. 23 represents one of the levers, adapted to be pivoted in the slot of a coiler-stem. Fig. 24 shows one of the coiler-shells. Fig. 25 is a side view of a guide-passage, L, which in the machine is located between bender F and the short passage shown in Fig. 22, the casing for said latter passage being included. Fig. 26 is a section taken on a horizontal plane through the guide-passage L, and shows a pair of spring controlled guide-jaws located in an enlargement of said passage. Fig. 27 is a transverse section through passage L, with a pair of connected wire hooks lying in different planes and in position to be drawn through said passage. Fig. 28 is a sectional elevation taken transversely through the machine on line 28 28, Fig. 2, looking toward the delivery end of the machine, the coiler not being shown for the sake of clearness of illustration. This view illustrates the mandrels by which the hooks are held while being coiled, and devices for operating said mandrels. Fig. 29 is a sectional elevation on a plane similar to the preceding figure, but looking toward the feed end of the machine. Fig. 30 shows the hooks of two wires before they have met and interlocked with each other. Fig. 31 shows the said hooks locked together. Fig. 32 has the same bent into a pair of connected eyes or links, with the terminals of the wires coiled to form checks or shoulders back of the eyes. Fig. 33 is a perspective view of the mandrels shown in Fig. 28 and the levers carrying the same, with the said eyes open and the interlocking hook ends of a pair of wires in the act of being drawn up to said mandrels. Fig. 34 is a like view, but with one hook caught on one mandrel, and the remaining mandrel in the act of passing between the sides of the remaining hook. Fig. 35 is a larger detail sectional view taken through one of the levers and showing a mandrel thereon, which view shows a plate adapted to hold the mandrel and secured to the lever. Fig. 36 shows on a larger scale a detail perspective view of the front or face end of one of the coilers. Fig. 37 represents a stem of one of the coilers. Fig. 38 shows in perspective on a smaller scale the face end of one of the said stems of the coilers. Fig. 39 is a detail perspective of the forward end of one of the levers designed to be pivoted in the coiler-stems. Fig. 40 is a detail perspective showing a movable jaw, 135, which in Fig. 36 is shown pivoted at the forward end of lever 128. Fig. 41 is an enlarged plan view of that portion of the machine to the left of line 1 1, Fig. 2. Fig. 42 is a side elevation thereof; Fig. 43, an enlarged plan view of that portion of the machine to the right of line 1 1, Fig. 2. Fig. 44 is a side elevation thereof. Fig. 45 is a detail section on line 45 45, and Fig. 46 is a detail section on line 46 46.

Referring by letter to the several figures of the drawings, in which like letters denote like parts, A indicates a long substantial frame provided with suitable bearings for the operative members of the machine.

At the feed end of the machine I arrange a set of straightening-rollers, B, for guiding and straightening the wire which is drawn from a conveniently-located spool. These straightening-rollers are arranged in pairs upon a bracket, A', attached to the frame of the machine, the axles for some of the rollers being set vertically and the axles for the remaining rollers being set horizontally, whereby the wire passing between these said rollers shall be effectively straightened.

A convenient arrangement of these straightening-rollers is illustrated in Fig. 3, in which the vertical rollers are arranged with their axles rising from the bracket, while the horizontal rollers are arranged in two horizontal planes, with the axles for the lower horizontal rollers supported on the bracket and the axles for the upper horizontal rollers secured to a hinged arm, B', which can be swung up so as to allow the wire to be readily introduced between the rollers. The wire is drawn through this set of straightening-rollers and fed forward at regular intervals by means of a pair of intermittingly-rotating feed-wheels, 1 and 2, mounted at the feed end of the machine. These feed-wheels are grooved peripherally for the passage of the wire, and are arranged face to face with a cog or gear-tooth on one wheel engaging a cog or gear-tooth upon the remaining wheel, so that one wheel shall serve as a means for driving the other.

In order to supply a lubricant to the grooved faces of these wheels, by and between which the wire is fed forward, I provide an oiler-wheel, 3, arranged to dip into an oil-reservoir, and also to project into the peripheral groove of the lower feed-wheel, from which latter the oiler-wheel is driven by frictional contact. The oiler-wheel is mounted upon an axle, 3$^a$, journaled in or on the sides of an oil-reservoir, 3$^b$, and is arranged to dip into and take up from a body of lubricant contained in the reservoir a quantity suitable for lubricating the faces of the feed-wheels. The upper feed-wheel is in the present instance driven from the lower feed-wheel through the instrumentality of the gearing with which said wheels are provided, and is mounted upon a short horizontal axle, 4, journaled in bearings 5 5, which are adjustably secured in any suitable way upon vertical rods 6, rising from some portion of the main frame. The feed-wheels are intermittently driven from a horizontal and longitudinally-arranged driving-shaft, 10, which runs along the middle of the machine, substantially from end to end of the latter, and as a means for thus intermittingly actuating the feed-wheels the said driving-shaft is provided with a clutch, C, automatically operated at intervals to connect the shaft with a suitable gearing arranged between the shaft and the lower feed-wheel, substantially as follows: The lower feed-wheel is mounted upon a transversely-arranged horizontal axle, 7, provided with a bevel-gear, 8, which gears with a bevel-gear, 9, formed or connected with one of the parts $9^a$ of the said clutch.

The operation of this clutch to connect the shaft 10 with the feed-wheel-actuating mechanism is effected by a clutch-operating mechanism, which is tripped and allowed to act for such purpose at regular intervals by the action of an advancing portion of the wire during a certain stage of the manipulation of the latter, and which therefore can be more appropriately hereinafter described.

Should the wire be accidentally broken or it become necessary to introduce a new wire into the machine during its operation and while the several parts of the wire in the machine are in various stages of manipulation, it will be found undesirable to continue the operation of the entire machine in order to feed the wire forward, as by so doing the completed wire will reel off the machine in as many parts as breaks occur. To obviate this difficulty and render the operation of the machine simple and perfect, a notched wheel, $7^a$, rigidly secured on the outer end of shaft 7, as clearly illustrated in Figs. 1, 2, 41, and 42, has its notches engaged by a gravity-pawl, $7^b$, secured to a crank-arm, $7^c$, and loosely pivoted to the outer end of the aforesaid shaft 7. When the said crank-arm is elevated by hand above a horizontal plane, the gravity of the pawl will cause it to drop into and engage one of the notches in the said wheel, and thereby enable the operator to rotate the shaft 7, and consequently the feed-rolls 1 and 2, so as to feed the wire forward without operating the other parts of the machine.

By reference to Figs. 1 and 42 it will be seen that when the crank-arm is allowed to swing free in a vertical line the pawl by its gravity will be out of contact with the said wheel. The wire is fed by the feed-wheels forward and over a horizontal table, H, between the rear end of which latter and the feed-wheels the wire is severed at regular intervals by a cutting mechanism, D, for which see Figs. 1, 2, 10, and 11, and more especially the last two of these said figures. The fixed jaw of this cutting mechanism consists of some suitable surface at one end of a short horizontal passage, 11, for the wire, which said passage runs through an upright, 12, to which the vibratory cutting-jaw 13 is pivoted.

The vibratory cutting-jaw is provided with a bent arm, 14, which extends transversely across the machine to a revolving wheel, 15, provided in or on one of its sides with a cam-way, $15^a$, engaging a stud or roller carried by a stud on the outer end of the vibratory cutting-arm.

At points beyond the table H are arranged two benders, E F, which operate simultaneously with each other, and which are each adapted during operation to bend the end of a wire into the form of a hook. These two benders are arranged so that the bender F shall be beyond the bender E—that is to say, at a point farther along the line of feed, and nearer to the delivery end of the machine—for a purpose which will hereinafter be explained.

At the commencement of the operation of this machine it is necessary to have one portion of a wire running from the supply-reel to the bender F, and a second wire running from the bender E to and past the delivery end of the machine, so that after the forward end of one wire and the rear end of the other wire have been bent into hook shape the wire running to the delivery end of the machine can be drawn forward, in order to cause its hook end to engage the hook end of the other wire, and thus bring the interlocking hooks up to the coilers, and after the operation of the coilers draw the perfected wire out from the machine at the delivery end of the latter. At a time prior to such advance of the wire running forward from the bender E the wire running back from the bender F to the supply-spool is severed by the cutter.

Hereinafter, in referring to the wires, so much of the wire as extends from the supply-spool to the cutter will be termed the "feed-wire," and so much of the wire as extends between the cutter and the bender F the "back wire," and from the bender E the "advance wire," it being understood that during the operation the back wire is severed from the feed-wire and drawn forward by the advance wire, and its place supplied by the feed-wire, which moves forward immediately after the back wire is shifted laterally. Assuming the advance wire to have had its rear end bent into hook form by the bender E and the forward end of the back wire to have been bent into a like shape by bender F, and the advance wire to have been drawn forward so that its hook shall engage and thereby draw forward the back wire, it will then become necessary to throw the rear end portion of the back wire to one side of the line of feed and out of the way of the reel-wire, which at said juncture in the operation is fed forward. For the purpose of thus pushing the rear end portion of the back wire out of the way of the feed-wire, I provide a set of kickers, G, (see Figs. 1, 6, and 15,) arranged to push or kick to one side the rear end of the back wire at a time when it is supported upon the horizontal table H, arranged between the cutter and the first of the two benders. This table, upon which the wire is supported and guided, is secured upon suitable supports, 17 and 17ª, rising from the main frame, (see Figs. 1 and 5,) and consists, essentially, of an oblong plate provided with transversely-arranged slots 18, in which the kickers G are arranged to operate. These kickers, preferably three in number, consist of fingers depending from a horizontal rock-shaft, 19, and arranged to pass down through the slots 18 in the table. These kickers normally hang in a vertical plane alongside a vertical wall or abutment, 20, which rises from and runs longitudinally with the table. At a time after the wire running from the reel to the bender F has been severed by the cutter so as to form what I have called a "back wire," the kickers are back, or nearly so, against the wall 20, as represented in Fig. 6, and the wire passing along the table is received in notches which are formed in the kickers by cutting away the kickers at their lower ends. The wire fed forward from the reel is maintained in the direct line of feed and in position in front of the kickers by means of a keeper, I, consisting of an angle-plate arranged above the table and connected by several transversely-arranged bars, 21, with a horizontal rock-shaft, 22, which is journaled at its end in brackets 23, attached to some portion of the main frame or some structure rigid thereon—as, for example, the piece or pieces which are formed with or secured upon the main frame—in order to provide the wall or abutment 20, described in connection with Fig. 6.

The keeper I is provided with slots 24, for the passage of the kickers G, in order that when the kickers are in their back position, as shown in full lines, they can pass down through the keeper, and also so that when the kickers are swung forward can pass out from the keeper, as indicated in dotted lines. When the keeper is in its lowest position, the wire passing forward from the feed-wheels lies upon table H in the direct line of feed, and is confined between the keeper and the kickers. After the wire has been severed by the cutter, the rock-shaft 19, carrying the kickers, is turned so as to swing the kickers forward, and thereby push the rear end portion of what is now a back wire out of the way of the feed-wire, so as to allow the latter to be fed forward from the reel to its allotted bender, and simultaneously with this operation of the kickers the rock-shaft 22, supporting the keeper I, is turned so as to raise the keeper from the table, and thereby allow the back wire to be pushed from under it.

The rock-shaft 22, carrying the keeper, is operated at the proper moments from wheel 15 through the medium of a pitman, 25, (see Fig. 10,) connected at one end with an arm, 26, secured on the said rock-shaft, and at its opposite end connected with a vibratory lever, 27, which is pivoted to the main frame and operated by a stud, 28, on one side of wheel 15. This stud (see Fig. 2 and dotted lines, Fig. 10) is arranged on that side of wheel 15 opposite the camway 15ª, (illustrated in Fig. 10,) and the pivoted lever 27 is caused to vibrate at regular intervals by the engagement therewith of the said stud.

The rock-shaft 19, carrying the kickers, is operated from the lever 25, by which the rock-shaft for the keeper is actuated, and for this purpose the rock-shaft carrying the kickers is provided at one end with an arm pivotally connected with the connecting-rod 25.

The rock-shaft carrying the kickers is mounted on bearings 19ª on the table, and is turned against a spring-resistance when it is operated to swing the kickers forward. This spring-resistance is provided by a spring, 30, connected with the rock-shaft and one of the bearings for the latter, and arranged so that the rock-shaft shall wind up the spring when the rock-shaft is turned to cause the kicker to push the back wire to one side of the line of feed. By such means, after the wire running forward from the reel has been reversed, the wire is pushed to one side, and after this the keeper and kickers are returned to their first position, so as to allow the feed-wire to be fed forward between the keeper and the kickers.

As a means for preventing the back wire from springing back or following back the kickers after it has been kicked to one side of the line of feed by the kickers, I provide a set of spring-latches, 31, preferably three in number, which are pivotally connected with the table H or some suitable bracket attached to the latter. These latches extend under the table, and have their catch ends arranged to project up through the slots 18 in the table with the beveled edge of each one of said catch ends nearest the kickers. By this arrangement when the back wire is forced away from the line of feed by the kickers it will ride over and depress the free or catch ends of the latches, which, as soon as the wire passes, will rise, and hence prevent the wire from springing back when the kickers retire or swing back to their normal vertical position. The back wire thus kept out and away from the line of feed by the spring-latches is illustrated in dotted lines, Fig. 6, where one of the latches is shown, in which said figure I have also shown in dotted lines the position of the latch when it is depressed by reason of the wire riding over it, and also the keeper raised from the table and one of the kickers swung out from the keeper. As the delivery-wire is thrown to one side of the line of feed with considerable rapidity by the kickers, there will be a tendency on the part of this portion of the wire to vibrate or spring back with the kickers after the latter have thus pushed the wire away from the line of feed, and while the latches are designed to prevent the wire from following the retreating kickers, yet it may happen under some circumstances that the wire will as the kickers retreat have a tendency to spring over the latches. To avoid this movement of the delivery-wire, and also to assist in maintaining the rear end of the back wire in line with the bender E, by which the rear end of the said wire is bent after the latter has been drawn forward, I provide upon the table H a combined guide and holder, 32, (see especially Fig. 15,) which is raised from the table during the forward movement of the kickers and allowed to drop upon the table and engage the wire after the latter has been thrown or kicked away from the line of feed and back of the catch end of the latches. This combined guide and holder for the wire consists of a bar pivoted at one end to a support, 33, on the table, and provided with a bent arm, 34, which rests upon a pin, 35, extending laterally from the rock-shaft 19, carrying the kickers. The free end of this bar or holder, by which the rear portion of the back wire is pressed down on the table in line with the first bender, E, is provided with one or more grooves, 36, so as to prevent the wire from slipping laterally from under the holder. When the kickers are swung forward, the holder is lifted from the table by means of the pin on the rock-shaft engaging under its arm 34, and as soon as the wire has been pushed under the holder and the rock-shaft commences to turn so as to swing back the kickers, the holder is of course allowed to descend and rest upon the wire. As the wire is held in this position on the table simply by the weight of the holder 32, it will be evident that while the rear end of the back wire is prevented from a lateral movement by reason of the grooved or corrugated under side of the holder, the latter will not interfere with the wire being drawn forward so as to bring the rear end of the said wire up to its allotted bender E. At a time after the rear end portion of the back wire has been thus pushed out of the way of the feed-wire the reel-wire is fed forward to the bender F, and the back wire is drawn forward so as to bring its end up to the bender E, the back wire lying upon the table at one side of the keeper I, and the feed-wire being fed forward under the said keeper by the feed-wheels.

In order to stop the said feed-wheels, so as to arrest the forward feed of the feed-wire at a moment when its end has been brought into position under the bender F, I provide in the line of said wire at a point beyond said bender a trip, K, which, when struck and operated by the end of the advancing feed-wire, releases a mechanism by which the clutch C is actuated, and the transmission of motion from shaft 10 to the feed-wheels thereby arrested. The trip K, which is best shown in Fig. 18, is in the nature of a bell-crank lever pivoted by a pin, 37, to a two-part bracket, 38, which is secured to the main frame of the machine. This bell-crank lever has its upwardly-extending arm 39 adapted to be acted upon by the end of the advancing feed-wire; or, if preferred, its said arm can be provided with a plate, 41, against which the wire shall strike. The upper arm of this trip is normally maintained in the line of feed and in position to be struck by the end of the advancing feed-wire by means of a spring, 42, secured to the bracket 38, and having one of its ends engaging the bell-crank. Over the lower horizontal arm, 40, of this bell-crank is arranged the forward and free end of a lever, 43, (see also Figs. 17 and 18,) which said lever 43 is arranged about midway of and transversely to the length of the machine. This lever 43 is pivoted by a pin, 44, at what may be termed its "rear end" to some stationary part of the main frame. A rod or pitman, 45, made extensible in any ordinary way—as, for example, by forming it of two parts having their opposing ends fitted in an internally-screw-threaded collar, 46—is pivotally connected at one end with the vibratory lever 43 and at its opposite end pivotally connected with a vibratory clutch-shifter, by which one part of the clutch C is operated. This clutch-shifter, which is best illustrated in Fig. 10, consists of an upright frame, 47, rigid at its lower end, with a horizontal rock-shaft, 48, which is mounted in suitable bearings, $48^a$, on the main frame of the machine. The sliding part of clutch C is mounted in this frame 47, which latter has one of its sides extended upwardly and connected by a pivot with one end of the rod or pitman 45, by which the sliding member of the clutch is operated. The said sliding member of the clutch C consists simply of a hub, 49, arranged to slide upon shaft 10, and provided with a wheel or flange, 50, adapted to engage with or to be disengaged from the wheel $9^a$, said hub 49 being carried by and arranged to revolve in a collar, 51, which is pivoted in the frame 47. It will be understood that the hub and the wheel 49 and 50 revolve with shaft 10, and can in practice be feathered thereon, so as to be capable of being shifted toward or away from wheel $9^a$; or, if preferred, the hub 50 can be loosely arranged on shaft 10 and engaged by pins projecting from one end of a collar, $10^a$, which is rigid upon the shaft 10, in which case the pin will enter holes formed in one end of hub 49, whereby, while the latter shall rotate with the shaft 10, it can also be susceptible of a sliding movement thereon. It is also understood that the clutch preferably operates upon the principle of an ordinary friction-clutch, which can be attained by concaving one side of wheel $9^a$ and beveling wheel 50 at one side or end, so that when the latter is forced into the side of wheel $9^a$ the said wheel shall be driven by reason of the frictional contact between the two wheels. The part 50 of the clutch is thrown into gear or clutch with the part $9^a$ by means of pitman 45, which throws part 50 forward and against some spring or weight resistance—as, for example, a weight, 52, suspended by a link, 53, from a horizontal arm, 54, extending from one side of the vibratory frame or shifter 47—which said weight or spring, as the case may be, tends to throw the sliding part 50 away from the remaining part $9^a$ of the clutch, and hence out of frictional contact with the same as soon as the clutch-operating mechanism has been released. The lever 43 is operated at the proper moment, so as to throw the rotary and sliding member of the clutch into engagement with the remaining member 9ª thereof, which is loosely arranged upon the driving-shaft, whereby motion shall be transmitted from the driving-shaft to the feed-wheels for the purpose of advancing the feed-wire. As a means of thus actuating the lever 43, the rotary shaft 16 is provided with a cam, 54, which, during the rotation of said shaft, is brought into engagement with roller 55, carried by an upright vibratory yoke-shaped frame, 56, which is pivoted or hinged upon the main frame of the machine and connected by a rod, 57, with the lever 43. The action of this cam is to swing the frame 46 toward the clutch, and hence, through the medium of lever 43 and the pitmen or connecting-rods 57 and 45, throw one part of the clutch forward and into gear with the remaining portion of the clutch.

In order to maintain the two parts of the clutch in gear with each other until the feed-wire has been advanced to the required extent, the clutch mechanism is locked as soon as the two parts of the clutch are in gear with each other, and at the proper moment released by the action of the end of the feed-wire against the trip K. For this purpose I provide under the lever 43 a stationary bar, 58, provided with a notch, 59, in which lever 43 drops after it has been drawn forward or toward the clutch by the action of the swinging frame 56. So long as lever 43 rests in this notch the two parts of the clutch will be maintained in gear with each other, and the feed-wire will be fed forward; but when the upper end of trip K is struck by the end of the advancing feed-wire, the upper arm of said trip will be swung back, and consequently its lower arm raised, so as to lift lever 43 out of the notch 59, at which instant the weight 52 will act to throw back the clutch mechanism, and hence swing the lever 43 back of the notch 59, and thereby cause the feed to be automatically stopped. It will be understood that at the moment when lever 43 is lifted and released from the notch and the clutch, and clutch mechanism thrown back by the weight or spring, the cam 54 on shaft 16 will be out of the way of roller 55 on frame 56, so as to allow the latter to swing back with the backward shift of the clutch-actuating mechanism, and that the said frame will swing back so as to again bring its roller 55 in the path of the said cam. After the forward feed of the feed-wire has been stopped and severed by the cutter, the forward end of this severed wire, which I now term a "back wire," is lifted up to the bender F by the upwardly-bent end of a pivoted spring-controlled lever, 60, which is shown partly in full and partly in dotted lines in Fig. 18. This lever, which I denominate the "wire-lifter," is pivoted at one end in a space within the pedestal 17, and has its free upturned end arranged to rise directly under the forward end of a back wire at the proper moment. The wire-lifter 60 is swung upwardly by one end of a vibratory lever, 61, arranged transversely in the machine and pivoted at 62 to some stationary part of the main frame. This lever 61 is turned about its pivot at the proper moment for swinging up the wire-lifter 60 by means of a cam, 63, arranged upon one side of a wheel, 64, and adapted to act during the revolution of said wheel against a roller, 65, carried upon one end of the vibratory lever 61.

The cam 63 is illustrated in dotted lines, Fig. 16, and the wheel which is provided with said cam is secured upon the horizontal rotary shaft 16.

To insure the depression of the wire-lifter after lever 61 has been released from the cam 63, I provide a spring, 60ª, against which the wire-lifter is raised.

The two benders E and F are each of the same construction, or substantially so, and are each adapted to bend an end of one of the wires into the form of a hook, (shown in Figs. 30 and 31,) these said benders being so arranged that the bender E shall bend the rear end of the advance wire into a hook lying in a horizontal plane, so that when the advance wire is drawn forward, after these hooks have been thus formed, the hook of the advance wire shall engage with the hook of the back wire, as illustrated in Fig. 33.

The construction of these benders will be best understood by referring to Figs. 12 and 13, in which the bender F is shown in side and end views. It will be seen that this bender comprises a cylindrical body, 66, enlarged laterally at one end, as at 67, and provided upon its face end with a finger, 68, and a small roller, 69, between which said finger 68 and roller the wire is received, so as to be bent into hook form when a partial revolution is given to the bender, as illustrated by dotted lines in said Fig. 13, in which said figure the feed-wire x is also shown in full lines passing between the roller and the bender.

The wire-lifter 60 (illustrated in Fig. 18) is designed to lift the end of one of the wires into proper position between the finger and the roller on bender F after the forward feed of the reel-wire has been stopped and the same severed by the cutter. The wire thus upheld by the wire-lifter is bent into hook form by the bender F, which makes a partial rotation to thus bend the wire and then turns back to its first position.

The bender F is operated by a horizontally-sliding rack-bar, 70, arranged transversely to the length of the machine, and engaging a gear, 71, which is formed with or secured upon the cylindrical body 66 of the said bender. This rack-bar slides through a case, 72, mounted upon the pedestal 17, and a suitable bearing, 73, on a rear pedestal, 74, and is reciprocated at the proper moment from wheel 64 through the medium of an upright vibratory lever, 75.

(Illustrated in Fig. 17.) This lever is pivoted at its lower end to some portion of the main frame, and at its upper end is provided with a notch in which a stud or collar, 76, upon the rack-bar engages.

The lever 75 is provided on one side with a stud or projection, 77, as shown in dotted lines, and the wheel 64 is provided upon one of its sides with a stud, 78, which latter during the revolution of the wheel comes in contact with the stud on the lever, and thereby swings the lever forward.

The rack-bar is provided with a downwardly-projecting stud, 79, and the wheel is provided on its periphery with a tooth formed by recessing the wheel, as at 80, whereby after the rack-bar has been moved forward by a forward swing of the lever 75 the stud on the rack-bar shall during the revolution of wheel 64 be engaged by said peripheral tooth of the latter, and hence the rack-bar be moved back into the position shown in Fig. 17. This stud and tooth on the wheel 64 are so arranged as to reciprocate the rack-bar at the proper moments, and hence effect the required partial revolution of the bender F successively in reverse directions for the purpose of bending the end of the back wire into hook shape and then returning the bender into its first position ready for the next wire.

The bender F is arranged to turn about a vertical axis, so that during its partial forward rotation it shall bend the forward end of the back wire in a hook on a horizontal plane, and the bender E is arranged to turn about a horizontal axis, as best illustrated in Fig. 14, whereby during a partial forward rotation of this latter bender it will bend the rear end of the advance wire in a hook on a vertical plane, whereby when the advance wire thus bent is drawn forward the two wires shall have the position relatively to each other as shown in Fig. 30, in which $x$ denotes the forward end of the back wire bent into a hook on a horizontal plane, and $y$ the rear end of the advance wire bent into a hook on a vertical plane, so as to be capable of interlocking with the hook of the back wire.

The bar 81 (illustrated in Fig. 16) is provided for the purpose of steadying and keeping the forward end of the back wire in position to be bent after said wire has been raised by the wire-lifter 60, and also for bringing and maintaining said wire after it has been bent into position to be engaged by the bent end of the advance wire at a time when the latter is drawn forward. This bar is reciprocated longitudinally at the proper moment, and is arranged to be capable of a limited swing in a vertical plane, so that at the required time its forward free end can rise and fall simultaneously with the up-and-down movement of the wire-lifter 60, by which it is raised. To such end the intermittingly-reciprocating bar 81 passes through a horizontal passage, 82, formed through the case 72, and shown in Fig. 17, said passage being of a height sufficient to allow a vertical play on the part of the bar, which is normally kept down in its lowest position in said passage by means of some suitably-arranged spring, 83, which said spring can be conveniently attached to the top wall of passage 82 and adapted to bear upon the bar 81.

The horizontal bar 81, which is arranged transversely to the line of feed, is widened and flattened at its forward end, as shown, and is provided on its under side at said end with a notch, 84, adapted to allow the hooks of the feed and delivery wires, when interlocked with each other, to stand therein, as illustrated in Fig. 16. This bar is also provided at its forward end portion with a horizontal slot, 85, commencing at a point at the side of the notch 84, and designed to receive the forward end of the back wire as the latter is bent into hook shape, whereby after the hook has been formed its end resting in the lower horizontal wall of said slot shall be supported, and the hook thereby maintained in a horizontal plane ready to be engaged by the hook-shaped end of the advance wire when the latter is drawn forward.

As a means for holding down the hook-shaped forward end of the back wire and for assisting in maintaining the hook in a horizontal plane as long as may be necessary, the bar 81 is also provided at its forward end with a spring-latch, 86, consisting of a bent pin having its vertical portion arranged to turn in the bar 81, and its lower horizontal portion arranged to cross notch 84 in the widened end of said bar. The lower horizontal portion of this latch is normally held across notch 84 and against one of the vertical sides of bar 81 by means of a spring, 87, in which position the latch will lie above the hook-shaped end of the wire $x$ after the same has been bent by the bender F. The latch, however, is susceptible of being swung out and away from the notch in order to allow the interlocking hooks of the wires to be drawn forward to the coilers, hereinafter to be described, for which purpose the hook-shaped end of the advance wire $y$, when the interlocking-wires are drawn forward from the position shown in Fig. 16, will strike and swing the latch out of the way.

Upon the pedestal is arranged an angle-plate, $60^b$, having a horizontal arm portion, $60^c$, Fig. 14, extending over the path of the wire passing to bender F. When the wire is lifted up to said bender by the lifter 60, the wire when in position to be bent by the same will be held between the wire-lifter 60 and the arm $60^c$ of plate $60^b$, which constitutes a rigid jaw, while, as will be seen, the lifter constitutes a movable jaw, which, while acting on the wire a little in advance of the rigid jaw, serves to hold the wire while the free end of the wire is being bent by the bender. The bar 81 is lifted simultaneously with the wire by reason of the wire which is raised by lifter 60 pressing up against the jaw 86. The bar 81 is pivotally connected at its rear end with a vibratory lever, 88, (see Fig. 2,) which is pivoted upon a bracket, 89, on the pedestal 17. This lever is operated from a wheel, 90, provided upon its periphery with a cam which acts against and actuates the lever at a time after the end of the wire has been bent into hook form by bender F, in order to retract the bar 81, and thereby bring the hook-shaped end of the back wire into position to be engaged by the hook at the end of the advance wire when the latter is drawn forward. The lever 88 has one end normally held in the path of the cam on wheel 90 by means of some suitably-arranged spring 91. The forward free end of bar 81 is raised by and with the rise of the wire-lifter 60, by which the feed-wire is lifted up to the bender F, and when said wire-lifter descends the bar 81 drops by gravity, which is aided by the downward pressure of a spring, 83, on said bar. This fall of the wire-lifter and the forward end of the bar occurs as soon as the end of the back wire has been bent into hook form, whereby the hook engaging in slot 85 of the slide-bar 81 shall be below and clear of the bender F, after which movement on the part of bar 81 said bar is drawn back, so as to bring the hook in the back wire in position to be engaged by the hook in the advance wire. After the interlocking ends of the two wires pass forward and beyond this point in the machine this intermittingly-operated slide-bar 81 is moved forward, so as to be in readinesss for the hook to be next formed in a succeeding feed-wire.

The bender E, which is formed and adapted to bend the end of the advance wire in the same way as the bender for the feed-wire, is operated simultaneously with the bender F for the feed-wire, for which purpose the intermittingly-reciprocating rack-bar 70 is provided on each of its vertical sides with a line of rack-teeth, the one engaging pinion 71 of bender F for the feed-wire, and the other engaging a pinion, 92, (see Fig. 14,) carried upon a short vertical spindle, 93, which also causes a second lower pinion, 94, engaging a horizontal and longitudinally-arranged sliding rack-bar, 95, which in turn engages a pinion, 96, upon the cylindrical body 97 of bender E. This bender for the advance wire performs its partial rotations about a horizontal axis, and has its finger 98 and the axis of its roller 99 arranged horizontally and substantially at right angles to the vertical end face of the body of the bender. While the feed-wire is being fed forward to the bender F it is guided across the top of pedestal 17 by means of an angle or channel plate, 100, (see Figs. 2 and 5,) which plate rests upon the top of pedestal 17 while the wire is being fed forward from the spool to the bender F, so that the said wire passing over the pedestal shall be guided in the horizontal passage 101, formed in the under side of said plate. This channel or guide plate 100 can be formed of one or more parts, as desired, so long as the distinctive feature of a horizontal passage, 101, running parallel with the line of feed, is preserved, and it is connected by a laterally-projecting arm, 102, with a rock-shaft, 103, mounted at the front side of the machine, in which way the guide-plate is free to be raised or lowered, as occasion may require. Thus while the wire from the reel is being fed forward to the bender F the said wire passes under the guide-plate, which is in its lowered position upon the top of the pedestal; but after said wire has been severed by the cutter to form the back wire, and the latter raised at its forward end by the wire-lifter 60 up to the bender F, the said wire in thus rising lifts the guide-plate 100, which latter then remains for a time in an elevated position, so that after the forward end of the back wire has been bent and lowered, as before described, the said wire can at the proper moment be moved to one side and from under the guide 100, it being remembered that the back wire is thus moved to one side by the retraction of bar 81, Fig. 17, at a time after the hook has been formed and the hook and free end of bar 81 are in their lowest positions, said lateral movement of the back wire being required, so as to bring the hook at its forward end in position to be engaged by the hook at the rear end of the advance wire at a time when the latter is drawn forward. In order to thus temporarily retain the guide-plate 100 in an elevated position, some suitable friction device is employed as a bearing for one of its journals—as, for example, the rock-shaft 103 is mounted in brackets 104, secured to pedestal 17, and in a recess in one of the sides of said brackets are arranged washers 104$^a$, preferably one of leather and the other of metal, which are fitted on one of the journals of the rock-shaft and compressed between the bracket and a shoulder on the rock-shaft at the point of juncture between the shaft and said journal. It will be evident, however, that other friction devices—such, for example, as a spring or springs bearing on one or both journals of the rock-shaft—could be employed. After the hook has been formed at the forward end of the back wire and the said wire has been drawn to one side and from under the guide-plate 100, the guide-plate 100 is swung down to its lowest position upon the pedestal 17 by means of a pitman, 105, extending transversely across the machine and connecting at its forward end with an arm, 106, on the rock-shaft, and at its rear end connecting with a swinging lever, 106$^a$, pivoted at its upper end to a standard, 107, and actuated at the proper moment by a pin (not herein shown) on one end of a hub, 90$^a$, of the wheel 90, whereby when said pin during the revolution of the wheel engages the lever 106$^a$ the latter will be operated so as to draw back the pitman 105, and thereby cause the guide-plate 100 to be swung down. Assuming a hook to have been formed at the forward end of the back wire by bender F, and a hook to have been formed at the rear end of the advance wire by bender E, and the advance wire to have been drawn forward until by reason of the engagement of its hook with the hook of the back wire the latter has been drawn forward to the required extent, it becomes necessary to provide means for shifting to one side the rear end of the back wire, so as to bring the same into position to be bent by the bender E, and hence to take the place of the advance wire which has been manipulated by and drawn forward from the said bender. To such end I provide a slide, 108, (see Figs. 4 and 14,) arranged transversely with respect to the length of the machine and supported along one of the vertical sides of pedestal 17 in some suitable way—as, for example, by means of a pin, 109, secured to the pedestal and passing through a short horizontal slot in the slide-bar 108. This slide-bar is moved forward and drawn back at the proper intervals from wheel 90 in any suitable way—as, for example, the rear end of the bar can be provided with a small roller received in the camway 110 in or on one side of the wheel 90.

The slide-bar is provided with a fixed and a pivoted jaw, the former consisting of an upright finger, 111, secured to the slide-bar and rising therefrom, and the latter consisting of a horizontal finger, 112, pivoted at one end to an attachment, 114, upon the bar, and is normally maintained with its free end in the position shown in Fig. 14 by means of a spring, 113. The wire is held between the rigid jaw 111 and the free end of the spring-jaw 112, so as to be bent into hook form by bender E in the following way: When the slide-bar 108 is projected out from the front side of the machine so as to bring its jaws away from bender E, the spring-jaw 112 is depressed by coming in contact with the under side of a forward corner portion of table H, which at this end has a corner extension, 112ª, secured upon the pedestal 17. In this way the free end of the jaw is pushed down, so as to pass under the back wire, and hence when the slide is subsequently retracted or drawn toward the rear side of the machine the spring-jaw, as soon as it is released from the table H, will rise, so as to engage the rear end of the wire, which will then be brought up to the bender E, when the slide 108 is in its back position, as in Fig. 14, in which, according to the terms hereinbefore employed, the back wire now becomes in turn an advance wire, while a wire from the reel is advanced so as to cross the bar 112 and move forward to the bender F, in order to supply a fresh back wire. As the wire is thus moved laterally by the jaws 108, so as to bring its rear end up to the bender E, the wire strikes against the beveled lower edge, 115, of a horizontal guide-plate, 116, which is pivoted so as to be raised by the pressure of the wire against its beveled edge, and thereby allow the wire to pass under it, after which the said plate drops and rests upon the top of bracket 17. As a mode of arranging the plate 116 to attain such results, it can at one end be pivoted to an angle-plate, 116ª, secured on the pedestal, said plate 116 being raised above the top of the pedestal at its pivoted end, but having its free end allowed to rest upon the pedestal, in which way, when the free end of the plate is pushed up by the laterally-moving wire, the latter can pass under the plate, and hence enter a guide-passage, 117, formed between the pivoted plate 116 and the inner vertical wall of the angle-plate, to which the vertically-swinging plate is pivoted. The finger 111, which, at a point opposite the spring-jaw 112, constitutes a rigid jaw for the wire, carries at its upper end a pivoted spring-controlled latch, 118, which normally hangs in the position shown in Fig. 14. As the end of the wire shown in said figure is bent upwardly and then forward or toward the delivery end of the machine to form a hook in a vertical plane, the end of the wire which is being bent strikes an inclined edge, 118ª, of the latch, and thereby pushes back the latch against its spring-resistance until the end of the wire passes below the latch, after which the latch will again swing out or forward to its first position, in which way the hook will lie in a vertical plane between the two jaws and be kept down by the latch 118. When the slide 108 is moved toward the front side of the machine so as to take the hook just formed away from bender E, the wire is drawn forward at a time when the hook is in line with passage 117, through which the hook will be drawn on its way forward to engage a hook formed by the bender F and kept in position to be thus engaged by means hereinbefore described. The forward movement of latch 118 can be limited by any suitable stop upon finger 111, and any suitable arrangement of spring-resistance can be provided for the latch. The advance wire being drawn forward by means hereinafter described, and its hook having engaged the hook of the back wire, so as to also draw forward the latter, these two wires pass through the machine until their hooks are brought up to the coilers and the rear end of the last wire has been brought up alongside the bender E. The two interlocking hooks, after passing beyond the bender F, are on their way to the coilers drawn through a horizontal passage, L, (best shown in Figs. 25, 26, and 27,) which is arranged between bender F and the first one of the two coilers M. This horizontal passage L is formed in a suitable case, 119, and is made in cross-section, somewhat on the plan of a Greek cross, whereby the interlocking hooks lying in planes at right angles to each other, as in Fig. 29, shall be properly guided as the wire is drawn through the passage. At a point where the interlocking hooks leave passage L the latter is enlarged, so as to afford space for a pair of spring-controlled fingers, 120 and 121, pivoted between the vertical side walls of the passage and arranged to converge toward each other at their free ends. These fingers are normally held in close proximity to each other at their free ends by springs 122 and 123, secured to the case and respectively acting against the pivoted fingers, which latter are thrown open or away from each other by the passing hooks. These spring-fingers act with a yielding pressure against the hooks and serve to insure the latter leaving the passage L, passing to the coilers in the position illustrated in Fig. 27, in which, as before mentioned, the hooks stand in planes at right angles to each other.

The casing 119, through which the passage L is formed, is secured upon a bracket, 124, (see Fig. 25,) which is fastened upon a standard, 125, rising from the main frame.

At a point just before the first one of the coilers M is a beveled guide-block, 126, arranged at or near the entrance to the stem of the said coiler. Ordinarily this guide-block is not needed, but occasionally it may happen that one end of the forward hook may be bent up a little too high for the hook to enter the hollow stem of the coiler, in which case the end of the hook striking the beveled face of the guide-block 126 will be bent or diverted downwardly, so that the hook shall fairly enter the stem of the coiler. The coilers M, which are best illustrated in Figs. 19 and $19^a$, Sheet 9, are constructed and operated in the same way, the only difference between the two being that of arrangement of position, it being seen from Figs. 1 and 2 that the coilers are arranged face to face, whereby the several operative members of these coilers are set reversely with relation to each other. The coilers M are each constructed and operated in the same way, and each comprise means for coiling the end of a hook around the wire back of the point where the two hooks connect or interlock with each other, so that after the coiling operation has been performed the sections of the wire shall be connected together at their ends by eyes $121^b$, Fig. 32, back of each one of which is a coil, 121, constituting a shoulder or check. A horizontal passage for the wire is formed through each coiler, and the coilers are arranged face to face in a horizontal plane, so that the interlocking hooks can be drawn through the body of one coiler and into a position between the opposing operative faces of the two coilers, and hence, after the ends of the hooks have been wrapped or coiled, the wire can then be drawn forward through the next coiler and onward to the delivery end of the machine.

Each coiler represented in detail in most of the views from Fig. 19 to Fig. 40, inclusive, comprises a hollow horizontal stem, 127, through which the wire is drawn, and a lever, 128, pivoted between its ends within a longitudinal slot in the stem 127, and provided at one end with a fixed and a movable jaw, between which and the free end portion of one of the interlocking hooks is held at a time when the stem is revolved to coil the wire. The hollow rotary stems 127 are each mounted at one end in one of a pair of standards, 129, and are each provided with a gear, 130, meshing with one of a pair of intermittingly-rotating gears, 131, Figs. 1 and 2, by means of which the coilers are rotated at proper intervals.

Each coiler-stem 127 is provided with a longitudinal slot, 132, running the greater portion of its length. The slot commences at what may be termed the "face" end of the coiler-stem, and runs back to a point near the gear 130 upon the stem. The levers 128, carried by these stems, are each pivoted between the walls of the longitudinal slots in the stems at a point intermediate of the ends of the levers, and are arranged so that the forward end, 133, of each lever shall project beyond the face end $127^a$ of the stem in which the lever is pivoted. These levers are each provided at their forward ends, 133, with a lateral extension, 134, to which is pivoted a jaw, 135, (see specially Figs. 36 and 40,) carrying a small roller, 137, arranged upon a stud on the jaw near one end of the latter. The rigid jaw 138 of each lever (see Fig. 39) is formed by a plate secured to the edge 133 of the lever and provided with a notch, $138^a$, formed in one end of the plate. The said jaws are relatively arranged with relation to each other upon their allotted levers, so that when the interlocking hooks are in position between the coilers, and after the levers have been operated in a manner which will be presently explained, the jaws 135 shall be turned about their pivots so as to hold the main wires back of the hooks between the ends 135 of the pivoted jaws and the sides of the notches or recesses $138^a$ at a time when the coilers are revolved, the rollers 137 under such conditions acting against the free end portions of the hooks so as to coil the same on the main wires. To allow the free ends of the hooks to be thus carried round by the rollers 137 upon the pivoted jaws, each stem 127 has at its face end a recess, $127^b$, which allows space for said free end of the hook during the coiling operation.

As a means for operating the pivoted jaws carried by levers 128, I arrange upon each coiler-stem a cylindrical shell, 139, which is keyed upon its allotted stem so as to revolve therewith, but to be capable of sliding longitudinally thereon. These shells work in suitable bearings on standards 140, and are each provided at one end with a slot or suitable opening, 141, coinciding with the slot in the stem. A small roller, 142, is arranged in each one of these openings in the shell in such position that the lever shall at its forward end portion rest upon the roller. The edges of the levers resting on these rollers are inclined or curved relatively to the length of the levers, as at $134^a$ in Figs. 19 and 39, so that when the shells are shifted toward each other, and hence moved upon the stems toward the face ends $127^a$ of the stems, the rollers 142, acting against the levers, will raise the ends 133 of the levers—that is to say, force the forward end portions of the levers from the slotted sides of the stems in a direction toward the diametrically-opposite sides of the stems. This movement on the part of each lever 128 will cause the end 135ᵃ of its pivoted jaw to clamp the wire in a notch, 138ᵃ. For this purpose each jaw consists of a substantially L-shaped plate having one of its arms pivoted in a notch, 134ᵇ, in an end of the lever. One end, 135ᵇ, of this plate, at a point beyond the pivot, extends into a notch, 127ᶜ, (see Fig. 36,) formed in a plate secured to, or a lateral extension formed at, the face end of the stem 127. Hence, when the forward end of the lever is raised from the position shown in Fig. 36, the end 135ᵇ of the jaw will strike against the wall at one end of notch 127ᶜ, which, in checking the movement of this end of the plate 135, will cause the opposing end of the plate, which constitutes the movable jaw, to swing round and thereby hold the main wire in the notch 138ᵃ, in which position the roller 137 will be brought against the free ends of the hooks, so that when the coilers are revolved the rollers will serve to push said ends of the hooks in the spaces 127ᵇ at the ends of the stems, and thereby coil the free ends of the hooks around the main wires, during which operation the coilers will be gradually moved apart by the increasing coils, which, as they increase in length, push back the coilers. When the wires are in position to be coiled and the coilers are revolved, the rollers, acting on the free end portions of the hooks, will cause the said ends to be coiled around the main wires back of a pair of mandrels, which, as hereinafter described, are, prior to the coiling operation, brought into position through the hooks, so that when the wires are coiled a pair of interlocking eyes, 121ᵇ, Fig. 32, shall be formed around the mandrels at the points of connection between the wires, and also the latter be held at their point of connection during the rotation of the coilers, in order that the ends of the hooks shall be properly coiled around the main wires.

The notch 138ᵃ, in which a main wire is held at the forward end of each one of the levers 128, can be made in a lug upon the lever, or notched plate 138ᵃ can be secured in a seat formed at one corner of the lever, as herein shown.

As a means for shifting the shells 139 upon their respective stems, I provide for each shell a vibratory yoke-frame, 143, pivoted at its lower end upon the main frame of the machine, and at its upper end connected with one of the shells in such manner that the shell shall be free to rotate, while a vibratory movement of the frame will cause a longitudinal reciprocatory movement on the part of the shell.

A convenient way of connecting the shells with their allotted operating yoke-frame will be to fit a band or annular upper portion, 143ᵃ, of the yoke-frame in an annular groove, 139ᵃ, formed in the periphery of the shell. (See Figs. 19 and 24.)

As a means for operating these frames so as to shift the shells 139 toward each other at a time when it is necessary to clamp the wires preparatory to coiling, and also to shift the shells away from each other to their farthest extent after the wires have been coiled, the yoke-frames are provided with horizontal arms 143ᵇ, Fig. 2, each provided at one end with a vertical portion, 143ᶜ, carrying a stud projecting in a cam-groove, 144, of a wheel, 145, mounted upon the long driving-shaft 16, in which way the yoke-frames are simultaneously operated at the proper moments.

The pins or mandrels, about which the eyes 121ᵇ are formed, and the mechanism for operating said mandrels, are best illustrated in Figs. 28, 33, 34, and 35. Of these two pins or mandrels the mandrel 146 is carried by a jaw or plate secured to the upper end of a bent pivoted lever, 147, and is arranged to be brought at the proper moment into a horizontal position, so that when a pair of interlocking hooks are drawn in position between the two coilers the hooks of the forward or advance wire lying in a vertical plane shall catch on the mandrel 146, as in Fig. 54, which will thus prevent the wires from being drawn farther forward until the lever 147 has been swung back so as to disengage the mandrel 146 from the wire. The mandrel 146, when in its forward position, enters a recess, 148, in a standard, 149, to which latter the said lever is pivoted. Lever 147 is actuated and its mandrel brought forward and in position to be engaged by the wire by means of a cam, 150, Figs. 2 and 28, arranged on one side of a wheel, 151, which is mounted on shaft 16. As soon as the lever is released by the cam it is restored to its normal position, as in Fig. 28, by a spring, 152, arranged upon a rod, 153, which is pivoted at one end to the rear arm of the lever, and arranged to work through a bracket-plate, 154, secured to the main frame, said spring being connected at one end with the rod, and at its opposite end connected with the said bracket-plate. During the coiling operation one of a pair of connected eyes, 121ᵇ, is thus formed around the horizontal mandrel 146, and simultaneously therewith the remaining eye is formed around a vertical pin or mandrel, 155, carried at the forward end of a vibratory lever, 156, and arranged to be brought down into position in the rear hook, which lies in a horizontal plane, as in Fig. 34. The lever 156 is pivoted to the standard 149, and is actuated by cams upon the wheel 151, of which cams the one 157 actuates the lever so as to swing its end carrying the mandrel downwardly, and thereby bring the mandrel in position in the rear hook of the back wire, while the cam 158 operates at the proper moment after cam 157 has passed a roller on the rear end of lever 156 to depress the rear end of the lever, and hence raise its forward end and lift the mandrel 155 clear of the wire at a time after the coiling has been performed. When the mandrel 155 is down and in position in the rear hook, it will enter a recess, 159, formed in a horizontal bar, 160, secured to the standard 149. In this way the levers 147 and 156 are operated so as to bring their respective mandrels in the hooks, as in Fig. 34, after which the coilers are simultaneously revolved, thereby coiling the free ends of the hooks around the main wires back of the mandrels, around which latter the eyes are formed, as already set forth.

The gear-wheels 131 (see Fig. 2) are shifted so as to be thrown at the proper moments in and out of gear with the gears 130 upon the coiler-stems by the following means: The gears 131 are respectively secured upon the ends of a sleeve, 161, which will be keyed or feathered on the constantly-rotating shaft 10 so as to revolve therewith, and also so as to slide longitudinally thereon. This shaft is caused to slide in reverse directions at the required times by cams 162 and 163, secured upon shaft 16, and adapted to alternately act upon an arm of an upright vibratory yoke-frame, 164, (see Figs. 2 and 29,) which is pivotally mounted upon the main frame of the machine, which yoke-frame carries a ring, 165, trunnioned or swiveled in the frame and encircling a wheel or hub, 166, which turns in said ring and is rigid with the sleeve 161. In this way the sleeve is shifted one way so as to throw the gears 131 in mesh with the gears on the coiler-stems, and after the coiling operation has been completed the sleeve is shifted so as to throw the gears 131 out of mesh with the said gears on the coiler-stems.

In order to arrest the rotary movement of the coilers after the gears 131 are shifted out of mesh with the gears 130, so as to leave the said coilers in proper position for operating upon the next loops, I have provided the automatic stop, more clearly illustrated in Fig. 45. This consists of a lever, 167, extending across the machine, pivoted on a suitable projection, 167$^a$, provided on a stationary portion of the frame, and having one arm thereof actuated by a cam, 167$^b$, rigidly secured to the shaft 16. The other or short arm of the lever projects over and bears upon a loose cap, 167$^c$, of a bearing-box, 167$^d$, provided at this point for the support of the coiler-stems. After the gears 131 are shifted out of mesh with gears 130, the cam on the shaft comes into contact with one end of the lever, depresses the other end thereof, and produces sufficient friction, through the medium of the movable cap, to arrest the rotary movement of the coiler-stem.

For convenience of access to the coilers, in cases where a greater degree of separation is required between them than the backward shift of the yokes 143 would give, the bearings of the coiler-stems in the standards 129 are shortened and pivoted to brackets. On these standards edgewise are plates 129$^a$, fitting between the bearings and the gears 130, which plates may be swung on their pivots and elevated out of the path of the said gear, and thereby permit the coiler-stems, after loosening up the collars in yokes 143, to have an endwise movement, which they could not have if these filling-plates were omitted. It may here be observed that these filling-plates do not co-operate as part of the mechanism of the machine, and might be omitted entirely without affecting in any manner the operation of the machine; but it sometimes occurs that a wire will become twisted around the mandrel or caught and detained on the face of the collar in such manner as to interfere with the operation of the machine, and at such time it is desirable to separate the coilers more than the operation of the machine would effect. Therefore I have provided filling-plates to effect this purpose. The same object would be attained if the caps of standards 129 were made to project beyond the standard in the path of the gear, occupying the same space as the filling-plate 129$^a$.

It will be seen that during the coiling operation the coilers are gradually forced apart by the wire coiling upon itself, and that such movement is completed by the swinging of the frames connected with the shells of the coilers. After each coiling operation the links and checks, or shoulders formed by the coils back of the same, are drawn forward through any suitable guide, 129$^a$, on standard 129. (See Figs. 7 and 2.) The finished wire passes forward from said guide to and around a large wheel, 169, arranged at the delivery end of the machine, and from this wheel the wire passes under the machine and back to and is wound upon a revolving spool, 170, located at a point near the feed end of the machine, as illustrated in Fig. 3. The wire, in passing from guide 129$^a$ to the wheel 169, passes over a frame, 171, and is kept down thereon by a pressure-block, 172, which rests on the wire and is carried at the free end of a rod, 173, pivotally connected with the frame 171. If preferred, however, the rod 173 could be made of spring metal and rigidly secured to the frame. The wheel 169 is mounted to turn at the upper end of a swinging standard, 175, which is pivoted at its lower end to some suitable bearing arranged beyond the delivery end of the machine, as in Fig. 7. This vibratory throw-lever is intermittingly actuated by a horizontal pitman, 176, connecting the throw-lever with the upper end of an arm, 177, of a rock-shaft, 178, which is operated through the medium of a vertical pitman, 180, connected at its lower end with a short arm, 179, on the rock-shaft, and at its upper end provided with a fork, 181, by which the reciprocating pitman is steadied at said end on shaft 16, which passes through the forked end of the pitman. This pitman is in turn operated at the proper moments by a heart-shaped camway, 183, in which a roller, 182, (shown in dotted lines) upon one side of the pitman is received. The camway is provided upon one side of a flanged gear, 184, which said wheel is secured on shaft 16, and serves to revolve shaft 10, through the medium of a flanged pinion fixed upon the shaft 10. The camway 183 is timed so that after each coiling operation the mechanism connected with the throw-lever 175, carrying wheel 169, shall be actuated so as to swing the latter away from the delivery end of the machine. As the throw-lever makes this movement the perfected wire will be drawn through the machine and all slack taken up. The wheel 169 being loosely mounted, necessarily turns during this action on the part of the throw-lever, in which way the wheel will run on a lower portion of the wire which extends from the wheel back under the machine. The reel 170 revolves continuously, and hence constantly and steadily takes up the wire. In order, therefore, to prevent the wire from pushing back through guide 129$^a$ when the throw-lever carrying the peripherally-grooved guide-wheel 169 is swung back toward the machine, in which case the wire will be slackened at a point beyond the delivery end of the apparatus, I provide swinging jaw 186, which, after the wire has been drawn forward, swings in a direction to clamp the wire against some stationary part of the frame 171 which serves as a stationary jaw. The swinging jaw 186 is fixed on the end of an arm secured to a horizontal rock-shaft, 187, which is mounted at the delivery end of the machine and provided with an arm, 188, (see Figs. 2 and 7,) carrying at one end a small roller which is secured in a cam-way formed, but not herein shown, in one side of the gear 184. The wire passing back from the wheel 169 at the delivery end of the machine to the spool or reel 170 at the feed end thereof passes over some suitable supporting-roller, 189, supported by one or more of the supports for the main frame. The spool or reel 170 is rotated from the revolving shaft 10 through the medium of an endless belt or chain, 190,-(see Fig. 3,) connecting a sprocket, 191, upon one end of shaft 10 with a sprocket upon one end of a lower horizontal shaft, 191, which latter at its opposite end carries a bevel-gear, 192, engaging a bevel-gear, 193, upon the axle of spool 170.

To insure the wire being wound in successive coils or layers upon the reel, the wire passing to the spool is guided by a slowly-vibrating guide, 194, consisting of a lever pivoted at one end to some suitable bearing, 195, on the main frame, and at its free end provided with a suitable guide-eye, through which the wire passes. This vibratory guide-lever carries a small roller, 196, (shown in dotted lines, Fig. 3$^a$,) which roller is received in a cam way, 197; also shown in dotted lines and formed in one side of a toothed wheel, 198, arranged upon a stud at the delivery end of the machine. This toothed wheel is operated by a pawl, 199, which, at its upper end, is provided with a strap, 200, fitting upon an eccentric, 201, secured on one end of the shaft 16, which latter is for convenience shown in dotted lines in Fig. 3$^a$, so as not to confuse it with the feed-wire. By this means the guide-lever 194 will be slowly vibrated, and hence the wire will be raised and lowered so as to allow it to wind on the reel from end to end of the latter. The sprocket 192 is loosely mounted on shaft 191, but is caused to turn therewith under ordinary circumstances by means of a suitable spring, 202, fitted on shaft 191, and held against one side of the sprocket by a nut, 203. This spring presses the sprocket against a washer, 204, preferably made of leather, and secured on shaft 191.

In this machine I have provided means for automatically stopping the operation of the same after the machine has performed some certain number of operations, in which way the machine will be stopped at a time when the wire from a supply-spool has run out. For this purpose a friction-wheel, 205, Figs. 42 and 46, is thrown out of gear with a belt-wheel, 206, at the proper moment by means of a mechanism hereinafter described, intermediate said friction-gear, and a stud, 207, Fig. 4, projecting from one end of a collar on shaft 16. The friction-clutch 205 (see Fig. 46) consists of a short horizontal shaft, 227$^a$, loosely journaled in suitable bearings provided on the stationary frame, and having a recessed belt-pulley, 206, loosely sleeved thereon. Against one face of this pulley works the friction wheel or plate 205, adapted to slide upon the shaft, and so arranged as to form a cover for the recess in the pulley. Located in this recess and coiled about the hub of the pulley is a spiral spring, 227$^b$, the tension of which causes the friction-wheel 205 to be normally held free from contact with the pulley. Extending across the face of the friction-wheel is the horizontal lever 225, which, when sufficient power is applied thereto to overcome the tension of the spring, produces a frictional contact between these two members sufficient to cause the pulley to impart to the plate its continuous rotary movement. This friction-plate has also upon its face two or more pins, 227$^c$, projecting into corresponding recesses provided upon one face of a collar, 227$^d$, at such a distance from the said friction-plate that the pins will never become entirely disengaged from the recesses by reason of the lateral movement of the said plate. This connection permits a lateral movement of the plate upon the shaft 227$^a$, but also imparts to said shaft through said connection a rotary movement, which rotary movement is imparted to the main driving-shaft 10 through the medium of the gears 226 and 227, which are respectively rigidly secured to the shafts 10 and 227$^a$.

The two parts of the friction-gear are suitably confined between the collars 227$^d$ and 227$^e$.

In the path of the stud 207 is arranged a spring-controlled lever, 208, pivotally secured at its lower end upon some portion of the main frame, and provided with a pawl, 209, engaging a toothed wheel, 210, which is arranged to revolve in the direction indicated by the arrow. At each revolution of shaft 16 the stud 207 strikes the lever 208, (which is normally held in the path of the stud by a spring,) whereby said lever will, through the medium of its pawl 209, turn wheel 210 the distance between two adjacent teeth. Before the completion of a revolution on the part of the toothed wheel a pin, 211, arranged on side of said wheel, and shown in dotted lines, strikes an end of an arm, 212, which projects from about the middle portion of a pivoted latch, 213. This latch is pivoted at its lower end to the main frame, and when in the upright position herein shown engages a stud, 214ª, upon pivoted bar 214, and upholds said bar, which at its rear end is pivoted at the rear side of the machine and arranged to extend at its forward end beyond the front side of the machine. As soon as the latch 213 is thrown by pin 211 on the wheel 210 forward and out of engagement with the stud on the pivoted bar 214, the latter is then left free to be solely upheld by a segment rib or plate, 215, formed on one side of wheel 210 at a point back of the pin 211, as illustrated in dotted lines. As soon, however, as this projection or segment-plate on wheel 210 passes a stud, 216, on the pivoted bar 214, (which stud while resting on the segment-plate served to keep the bar from dropping,) the bar 214 is free to swing down, in which movement it is assisted by a weight, 217, suspended from the said bar. Under and in the path of the free end of this pivoted bar is an arm, 218, secured upon a shaft, 219, and normally placed in a raised position, as shown in dotted lines, so that when the pivoted bar is allowed to swing down its forward end will strike the arm 218 and depress the same, so as to give a partial rotation to the shaft 219. This shaft (see Figs. 1 and 2) is mounted in bearings at the front side of the machine, so as to be susceptible of an end as well as an oscillatory movement, and carries at one end a hub or collar, 220, rigid upon the shaft, and provided at one end with a concave recess, 221. When the arm 218 of this shaft is down, as in Fig. 1, this recess is opposite a horizontal pin, 223, fixed in a bracket, 224, on the main frame, which pin is then received in said recess. When, however, arm 218 is raised, the shaft will be turned, and the wall of the recess, bearing against pin 222, will act as an incline and force the collar and shaft carrying the same away from the pin, during which end movement a collar, 224, on the shaft will act against a horizontal shipping-lever, 225, connected with the sliding part 205 of a sliding clutch, and thereby force the same into frictional gear with a belt-wheel, 206, whereby power from the belt-wheel will be transmitted to a gear, 226, on shaft 10, through the medium of a pinion, 227, in the spindle of section 205 of the friction-clutch; but after the machine has performed a certain number of operations arm 218 on shaft 219 will be depressed by the pivoted bar 214, in the manner hereinbefore described, in which way the shaft 219 will be turned so as to bring the recess 221 opposite pin 222, in which way the shipping-lever 225 will be released from pressure, and hence the sliding member 205 of the clutch allowed to stop, since it will be no longer held against the side of the belt-wheel.

The functions of the various members of this machine have been hereinbefore fully described in connection with a description of the construction of the said parts, and hence a brief description only of the general operation will now be necessary. Assuming a wire to be passing from bender E to the delivery end of the machine and thence back to the reel on which the finished wire is to be wound, and also a wire to be passing from bender F back to the cutter, the wire-lifter will lift one wire up to bender F and the kickers will then kick the rear end of said wire away from the line of feed. The benders will then operate to form a hook at one end of each wire, after which the wires are released from the benders, and the wire acted on by the bender E, which is first in position in the machine, will be drawn forward so as to engage the hook of the other wire at a point under the bender F, second in position in the machine, the throw-lever effecting this movement also serving to draw the wire forward until the hooks are in position between the coilers, when the free ends of the hooks are coiled around the wires. At or about the time the advance wire is drawn forward so as to engage and draw forward the remaining wire a fresh or new wire is fed forward by the feed wheels. The slide 108 moves toward the front side of the machine, so as to carry jaw 112 away from bender E, and said jaw, in striking under the extension 112ª of table H, is depressed so as to pass under the wire. The slide then moves back, carrying the end of a wire up to the bender E, which wire is the one previously bent at its forward end by bender F and now being drawn forward by reason of the advancing wire previously bent by bender E and drawn forward so as to engage the hook just formed at the bender F. The wire advancing from the feed-wheels or feed-rollers passes through the passage formed over table H and between keeper I and wall 20 on said table, and also passes over the spring-controlled latch or jaw 108 at a point back of the enlarged free end of the latter. When this wire arrives at a point just beyond the bender F, it strikes tripping-lever K and actuates said lever, which in turn lifts and releases latch 43, which allows the sliding member of clutch C to be thrown out of gear with the remaining clutch-member, in which way the mechanism actuating the feed-wheels is disconnected from shaft 10 and the feed stopped. The bending operation again takes place, and one wire is drawn forward so as to engage and draw forward the remaining wire. The coiling is effected at regular intervals by the coilers, and the finished wire is wound on the reel.

Having described my invention, what I claim, and desire to secure by Letters Patent, is—

1. In a machine for making check-row wire, a pair of simultaneously-operating benders constructed and arranged to bend the ends of wires passing through the machine into hooks lying in planes substantially perpendicular to each other, for the purpose set forth.

2. In a machine for making check-row wire, the two rotating benders arranged to turn about axes in planes substantially at right angles to each other, for the purpose described.

3. In a machine for making check-row wire, the two rotary benders arranged to bend the ends of the wires into hook shape, substantially as described, in combination with a throw-lever, by which one wire is drawn forward so as to bring its hook into engagement with the hook of the remaining wire, substantially as set forth.

4. In a machine for making check-row wires, the two rotary benders constructed and operating substantially as described, in combination with means for drawing forward a wire from one bender so as to bring the hook at its rear end into engagement with the hook formed by the remaining bender at the forward end of another wire, and an intermittingly-reciprocating slide, by which the rear unbent end of the said latter wire is at the proper moment brought and held in position to be bent by the first specified bender, substantially as described.

5. In a machine for making check-row wire, the benders E and F, located and operating substantially as described, in combination with means for drawing forward a wire from one bender so as to cause its hook to engage the hook formed at the end of a wire by the other bender, and an intermittingly-actuated feed mechanism by which a wire from the reel is fed forward at regular intervals to the bender F, substantially as and for the purpose described.

6. In a machine for making check-row wire, the benders E and F, located and operating substantially as described, in combination with means for drawing forward a wire from one bender so as to cause its hook to engage the hook formed at the end of a wire by the remaining bender, and to also draw forward the rear unbent end of said wire into a position opposite the bender E, substantially as and for the purpose described.

7. In a machine for making check-row wire, the two benders E and F, located and operating substantially as described, in combination with means for drawing forward a wire from one bender so as to cause its hook to engage a hook formed at the end of a wire by the remaining bender, an intermittingly-actuated feed mechanism by which a wire is at regular intervals fed forward to the bender F, and an intermittingly-actuated cutter by which said wire is severed after it has been fed forward to the required extent, substantially as described.

8. In a machine for making check-row wire, the two benders situated in different planes, and operating substantially as described, in combination with an intermittingly-actuated feed mechanism by which a wire is fed forward to a bender nearest in position to the delivery end of the machine, an intermittingly-actuated cutter by which the wire is severed at regular intervals, and an intermittingly-reciprocating slide operating transversely to the line of feed, and constructed to bring the rear end of said wire in line with the bender which is nearest the feed end of the machine, substantially as described.

9. In a machine for making check-row wire, the two benders situated in different planes, and operating substantially as set forth, in combination with the intermittingly-vibratory kickers, by which a wire running back from one bender is pushed out of the line of feed, substantially as described.

10. In a machine for making check-row wire, the bender F, in combination with the intermittingly-operating wire-lifter 60, by which the end of a wire is lifted up to the said bender, substantially as described.

11. In a machine for making check-row wire, the bender F, in combination with the pivoted wire-lifter 60, a pivoted lever by which the wire-lifter is raised and allowed to descend, and a revolving cam by which the said pivoted lever is intermittingly actuated, substantially as described.

12. In a machine for making check-row wire, the bender F, in combination with the intermittingly-reciprocating slide 81, notched and slotted at one end to receive the wire, and susceptible of being raised and lowered at said end, for the purpose set forth, and a swinging wire-lifter, 60, whereby said slide is raised and lowered simultaneously with the rise and fall of the wire, substantially as described.

13. In a machine for making check-row wire, the slide 81, notched at one end, and provided with a spring-latch normally held across said notch, which latch is arranged to be swung away from the notch by a bent wire drawn through the latter, substantially as described.

14. In a machine for making check-row wire, the slide 81, carrying a spring-latch, in combination with a vibratory lever, 88, and a revolving cam-wheel provided with a tooth, said slide being alternately engaged by the lever and the tooth, substantially as described.

15. In a machine for making check-row wire, a feed mechanism for feeding forward the wire to one bender, in combination with a lever projecting in the path of the wire, and a clutch mechanism connected with said lever, which is released by the action of the wire against the lever during the forward feed of the wire, so as to stop the feed, substantially as described.

16. In a machine for making check-row wire, the feed mechanism for feeding forward the wire, in combination with a clutch, a tripping-lever, and a rod and lever connection between said clutch and trip, said trip being located in the line of feed and actuated by the forward end of the advancing wire, so as to release the clutch mechanism and thereby stop the feed, substantially as described.

17. In a machine for making check-row wire, the feed mechanism, in combination with a tripping-lever, K, located in the line of feed, a clutch mechanism by which the feed mechanism is coupled with or uncoupled from the driving-shaft, and a latch for the clutch mechanism, which is released by the tripping-lever, so as to allow the clutch mechanism to uncouple the feed mechanism from the driving-shaft, substantially as described.

18. In a machine for making check-row wire, the tripping-lever K, located in the line of feed, in combination with a pivoted latch, 43, connected with a clutch-shifter, and a revolving cam by which the latch is moved forward and locked, so as to hold and maintain the two members of the clutch in connection with each other, substantially as described.

19. In a machine for making check row wire, a feed mechanism for feeding forward the wire, in combination with a clutch through which the feed mechanism is operated or allowed to stop, a revolving cam, and a lock mechanism operated by said cam to bring and hold the sliding member of the clutch in engagement with the remaining member thereof, substantially as described.

20. In a machine for making check-row wire, the vibratory tripping-lever K, normally maintained in the line of feed, in combination with a pivoted latch connected by suitable connecting-rods with the clutch-shifting lever and a vibratory frame, 56, and the revolving cam situated to operate the vibratory frame in order to effect a forward sliding movement on the part of the member of the clutch carried by the clutch-shifter, substantially as described.

21. In a machine for making check-row wire, the vibratory tripping-lever K, normally maintained in the line of feed at a point near one of the benders, in combination with a pivoted latch situated above a lower arm of the said lever, and a clutch mechanism connected by a suitable connection with the latch, and held in a forward position by the same until the latch is released by the action of the vibratory tripping-lever, substantially as described.

22. In a machine for making check-row wire, the benders E and F, in combination with an intermittingly-reciprocating double rack-bar engaging a pinion upon the spindle of one of the benders, and also engaging a gear mechanism connected with a pinion upon the spindle of the remaining bender, substantially as described.

23. In a machine for making check-row wire, the intermittingly-reciprocating slide 108, carrying jaws for pushing a wire away from the direct line of feed, in combination with the rotary bender operating about a horizontal axis, substantially as described.

24. In a machine for making check-row wire, the rotary bender operating about a horizontal axis and the reciprocating slide, in combination with a spring-jaw and a fixed jaw carried by the said slide, substantially as described.

25. In a machine for making check-row wire, the slide carrying a spring-jaw, 112, and situated transversely to the line of feed, in combination with a stationary abutment by which the spring-jaw is depressed to allow the jaw to pass under the wire when the slide is moved in one direction, substantially as described.

26. In a machine for making check-row wire, the bender E, substantially as described, in combination with a pair of jaws by which the wire is held in position to be bent by the said bender, and a pivoted latch hung above the point at which the wire is held between the jaws, and arranged to be swung aside by the free end of the wire while being bent into hook form, and to subsequently swing back in position over the hook, substantially as described.

27. In a machine for making check-row wire, the pivoted plate 116, constituting one side of a passage situated in line with a bender, in combination with a jaw carried by a sliding support, whereby the jaw in moving forward to the bender shall push the wire against the said pivoted plate, so as to lift the same and cause the wire to enter the guide-passage, substantially as described.

28. In a machine for making check-row wire, the bender F, in combination with a stationary jaw, $60^e$, and the wire lifter 60, by which the wire is raised and held against said jaw during the operation of the bender, substantially as described.

29. In a machine for making check-row wire, one or more vibratory kickers situated between the cutter and the benders, and operating to push the end portion of the wire nearest the cutter away from the line of feed, substantially as described.

30. In a machine for making check-row wire, the kicker or kickers normally maintained at one side of the line of feed, in combination with a latch by which the wire thrown out of the line by the kickers will be caught and prevented from springing back into the line of feed, substantially as described.

31. In a machine for making check-row wire, the kicker or kickers normally maintained at one side of the line of feed, in combination with a swinging keeper adapted, when in a lowered position, to form a side wall for a passage in the line of feed, substantially as described.

32. In a machine for making check-row wire, one or more vibratory kickers, G, in combination with a swinging keeper, I, provided with openings for the passage of the kickers, and means by which the kickers and the keeper are simultaneously operated, substantially as and for the purpose described.

33. In a machine for making check-row wire, a horizontal table situated between the cutting and bending mechanism, in combination with a vibratory kicker, G, passing through an opening in the table, and a spring-latch which is normally projected at its catch end above the table, and depressed by a wire which is being pushed away from the line of feed by the kickers, substantially as described.

34. In a machine for making check-row wire, the swinging keeper and the vibratory kickers, in combination with rock-shafts carrying the keeper and the kickers, a lever pivotally connected with arms on the said rock-shafts, and means, substantially as described, for intermittingly reciprocating the said lever, for the purpose described.

35. In a machine for making check-row wire, the vibratory cutter 13, in combination with a rotary bender, a feed mechanism, by which a wire is fed forward to said bender, and a rotary wheel provided with a camway timed to operate the cutter at a moment after the wire has been finally fed forward in position to engage its forward end with the said bender, substantially as described.

36. In a machine for making check-row wire, the rock-shaft carrying the kickers, in combination with a pivoted jaw or holder, 32, mounted above table H and operated from said rock-shaft, substantially as described.

37. In a machine for making check-row wire, the benders forming open hooks in the wires, the mandrels, and the coilers beyond said benders, in combination with a feed mechanism, whereby the open hooks are automatically fed forward to the mandrels and coilers, and their open free ends closed over the mandrels and coiled about the main wire outside the mandrels, substantially as described.

38. In a machine for making check-row wire, the benders forming open hooks, and a mechanism for interlocking said hooks at a right angle to each other and simultaneously drawing them forward in their open condition, in combination with the mandrels, and two coilers opposing each other, with their coiling rollers or ribs arranged at a right angle to each other beyond the benders, and rotating in opposite directions, substantially as described.

39. In a coiler for the purpose described, the hollow rotary stem, in combination with a lever pivoted in the stem, a fixed and a movable jaw carried by said lever, and a shell sliding upon the stem, the construction and arrangement of the parts being such that when the shell is moved toward one end of the stem it actuates the pivoted lever so as to bring the jaws into position for holding the wire, substantially as described.

40. In a coiler for the purpose described, the hollow rotary stem carrying a pivoted lever, 128, in combination with a shell fitted to turn with and slide longitudinally upon the hollow stem, the fixed and pivoted jaws at one end of the pivoted lever, and a roller, 137, carried by the pivoted jaw, substantially as described.

41. In a coiler for the purpose described, the hollow slotted stem, in combination with the lever 128, pivoted in the slot of the stem, and provided at one end with a pair of jaws, and means, substantially as described, whereby the jaws are closed, for the purpose set forth.

42. In a coiler for the purpose described, the hollow rotary stem provided at one end with a side opening, 127$^b$, in combination with a pivoted jaw carrying a roller, 137, by which the free end of a wire hook is pushed, during the operation of coiling the same, through the side opening in the stem, substantially as described.

43. In a coiler for the purpose described, the hollow rotary stem, in combination with the pivoted lever 128, carried by the stem, the pivoted jaw carried at one end of the pivoted lever, and a lateral extension on the stem having a notch, 127$^c$, in which the rear end of the pivoted jaw is received, whereby when the lever is vibrated its pivoted jaw shall be operated, substantially as described.

44. In a coiler for the purpose described, the hollow slotted stem 127, in combination with a pivoted lever, 128, carrying at one end a fixed and a pivoted jaw, and a shell, 139, keyed to slide upon the stem, and provided with a roller, 142, substantially as and for the purpose described.

45. In a coiler for the purpose described, the hollow rotary stem, in combination with the pivoted lever carrying at one end a pivoted jaw, a shell, 139, keyed to slide on the hollow stem, and a vibratory yoke-frame for effecting a sliding movement on the part of the shell, substantially as described.

46. In a check-row-wire machine, the rotary coilers adapted to coil the free ends of a pair of wire hooks, in combination with the mandrels 146 and 155, each supported by a vibratory lever, substantially as set forth.

47. In a check-row-wire machine, the pivoted levers 147 and 156, each provided at one end with a pin or mandrel, in combination with a pair of rotary coilers of the character described, for the purposes set forth.

48. In a check-row-wire machine, a pair of rotary coilers of the character described, in combination with a standard supporting a pair of pivoted levers respectively provided with pins or mandrels 146 and 155, and sockets in which said mandrels are received when the latter are in position to hold the wires, substantially as set forth.

49. In a check-row-wire machine, a pair of rotary coilers of the character described, in combination with the mandrels carried by pivoted levers, and means adapted to operate the levers, and timed to actuate the same so as to bring the mandrels in position for holding the hooks at a moment when they are in position between the coilers, substantially as described.

50. In a check-row-wire machine, a pair of rotary coilers of the character described, in combination with levers 147 and 156, each carrying a mandrel, a rotary wheel provided with cams 157 and 158, and a spring, 152, connected with one of the levers, substantially as described.

51. In a check-row-wire machine, the spring-guide levers 120 and 121, located at the forward end of a guide-passage, L, which is situated between the coilers and the benders, substantially as described.

52. In a check-row-wire machine, the guide-passage L, formed, substantially, in cross-section, in the shape of a cross, and located between the bending and the coiling mechanisms, substantially as described.

53. In a check-row-wire-machine, the swinging channeled guide-plate 100, connected with a rock-shaft, in combination with the bender F, to which a wire is guided by said guide-plate, and mechanism for raising and lowering said guide-plate at proper intervals, substantially as described.

54. In a check-row-wire machine, mechanism, substantially as described, for intermittingly feeding forward a wire, in combination with mechanism for bending the forward end of the wire into hook form, means for severing the wire at regular intervals, means for drawing the wire forward, and mechanism for bending the rear end of the wire into hook form simultaneously with the forward end of the next following wire, substantially as described.

55. In a check-row-wire machine, a pair of rotary benders for simultaneously bending one end of each of two wires into hook form, in combination with means for drawing one wire forward so as to engage the hook of and draw forward the remaining wire, and a pair of intermittingly rotary coilers, by which the free ends of the hooks are coiled around the wires to form checks or shoulders, substantially as described.

56. In a check-row-wire machine, a pair of rotary benders for simultaneously bending one end of each of a pair of wires into hook shape, in combination with means for drawing forward one wire so as to cause its hook to engage the hook of the remaining wire and draw both hooks forward to a pair of coilers, a feed mechanism by which a wire is fed forward at intervals to one bender to take the place of a wire previously acted upon by the said bender, a cutting mechanism by which said wire is severed from the reel-wire after it has been drawn forward, and means for carrying the rear end of said wire into position to be bent by the remaining bender, said mechanism being timed to act successively, substantially as described.

57. In a check-row-wire machine, the intermittingly-operating coilers, in combination with gears 131 on a shaft fitted to turn with and slide longitudinally upon a rotary driving-shaft, a vibratory frame or lever connected with the said sleeve, and a revolving cam operating said frame or lever at intervals, whereby the gears are thrown into or out of connection with gears on the coilers, substantially as described.

58. In a check-row-wire machine, the vibratory bent lever K, having its upper end normally standing in the line of feed, in combination with latch 43, a notched plate, 58, in which said latch is locked, and from which the latch is released by the upward movement of the lower arm of the lever, and a clutch-actuating mechanism, substantially as described, connected with the latch, for the purpose set forth.

59. In a check-row-wire machine, a pair of rotary benders opposing each other, and each consisting of a body, 66, having at one end a lateral extension with a single pin, 68, and a roller, 69, arranged upon the end of the body, which is enlarged by reason of said lateral extension, substantially as described.

60. In a check-row-wire machine, the bender E and the bender F, respectively mounted to turn about a horizontal and a vertical axis, in combination with mechanism by which a reciprocating partial rotation is simultaneously imparted to the said benders, for the purpose described.

61. In a check-row-wire machine, the straightening-rollers B, mounted to turn about axes in different planes, in combination with the lever B', carrying the upper set of horizontal straightening-rollers, substantially as described.

62. In a check-row-wire machine, the bender E, in combination with an angle-plate, $116^a$, secured upon the top of a support, and the plate 116, pivoted to the angle-plate, and having a lower beveled edge, said plate being raised above the support at its pivoted end, substantially as and for the purpose described.

63. In a check-row-wire machine, the feed-wheels and the intermeshing gears thereon, in combination with shaft 10, and gearing intermediate of said shaft and the feed-wheels, a clutch by which said gears are connected with the shaft, and a clutch-shifter and latch operated by a wire advanced by the feed-wheels at a time when the wire is in a position at one of the benders, substantially as described.

64. In a check-row-wire machine, the table H, having at its forward end an extension, $112^a$, in combination with the pivoted spring-latch 112, carried by a slide, 108, and depressed under the line of feed when the slide is operated to bring the latch under said extension of the table, substantially as described.

65. In a check-row-wire machine, the intermittingly-actuated slide 108, in combination with a spring-latch, 112, carried by said slide, a fixed jaw, 111, on the slide, and a latch, 118, pivoted on the fixed jaw, substantially as described.

ELIJAH P. PEACOCK.

Witnesses:
JNO. G. ELLIOTT,
W. W. ELLIOTT.